(12) United States Patent
Ishii et al.

(10) Patent No.: US 11,875,385 B2
(45) Date of Patent: Jan. 16, 2024

(54) INFORMATION COMMUNICATION SYSTEM AND INFORMATION COMMUNICATION METHOD

(71) Applicant: Rakuten Group, Inc., Tokyo (JP)

(72) Inventors: Jun Ishii, Tokyo (JP); Takehito Nohara, Tokyo (JP); Sungsu Kim, Tokyo (JP); Fuminori Hayashi, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/644,666

(22) Filed: Dec. 16, 2021

(65) Prior Publication Data

US 2022/0261854 A1    Aug. 18, 2022

(30) Foreign Application Priority Data

Feb. 12, 2021   (JP) .................................. 2021-20675

(51) Int. Cl.
   *G06Q 30/0251*   (2023.01)
   *G06Q 30/0241*   (2023.01)

(52) U.S. Cl.
   CPC ..... *G06Q 30/0269* (2013.01); *G06Q 30/0277* (2013.01)

(58) Field of Classification Search
   CPC ............. G06Q 30/0207–0277; G06Q 30/0269
   USPC ........................................... 705/14.64, 14.66
   See application file for complete search history.

(56) References Cited

U.S. PATENT DOCUMENTS

| | | | | |
|---|---|---|---|---|
| 2002/0065855 A1* | 5/2002 | Meyers | ................. | G06F 40/174 715/201 |
| 2002/0131496 A1* | 9/2002 | Vasudevan | ......... | H04N 21/2402 375/240.11 |
| 2003/0195801 A1 | 10/2003 | Takakura et al. | | |
| 2004/0254859 A1* | 12/2004 | Aslanian, Jr. | ........ | G06Q 10/107 705/26.5 |
| 2005/0228680 A1* | 10/2005 | Malik | ...................... | H04L 51/04 705/26.1 |
| 2006/0167747 A1* | 7/2006 | Goodman | .......... | G06Q 30/0264 705/14.66 |

(Continued)

FOREIGN PATENT DOCUMENTS

| | | |
|---|---|---|
| JP | 2002-123477 A | 4/2002 |
| JP | 2006-191608 A | 7/2006 |

(Continued)

OTHER PUBLICATIONS

Matthew Guay, Everything you need to know about Google Chat, 2020 (Year: 2020).*

*Primary Examiner* — Tarek Elchanti
(74) *Attorney, Agent, or Firm* — Sughrue Mion, PLLC

(57) ABSTRACT

An information communication system acquires first user information indicating a first user and second user information indicating a second user based on transmission of a message from a first terminal device used by the first user to a second terminal device used by the second user. The information communication system transmits, to the first terminal device, a first advertisement corresponding to an attribute of the first user indicated by the acquired first user information. The information communication system transmits, to the second terminal device, a second advertisement corresponding to an attribute of the second user indicated by the acquired second user information.

9 Claims, 19 Drawing Sheets

(56) References Cited

U.S. PATENT DOCUMENTS

| | | | |
|---|---|---|---|
| 2008/0034040 A1* | 2/2008 | Wherry | G06Q 10/107 709/204 |
| 2008/0307052 A1 | 12/2008 | Krishnan et al. | |
| 2009/0016507 A1* | 1/2009 | Altberg | H04M 3/4878 379/114.01 |
| 2009/0132371 A1* | 5/2009 | Strietzel | G06Q 30/02 705/14.46 |
| 2010/0235235 A1* | 9/2010 | Hosseini | G06Q 30/0251 709/206 |
| 2011/0087540 A1 | 4/2011 | Krishnan et al. | |
| 2011/0087541 A1 | 4/2011 | Krishnan et al. | |
| 2011/0320273 A1* | 12/2011 | Miranda-Steiner | G06Q 30/02 705/14.49 |
| 2013/0085849 A1* | 4/2013 | Dyor | G06Q 30/0255 705/14.49 |
| 2013/0085855 A1* | 4/2013 | Dyor | G06F 3/048 715/728 |
| 2013/0086499 A1* | 4/2013 | Dyor | G06F 16/951 715/764 |
| 2013/0151339 A1* | 6/2013 | Kim | G06Q 30/02 705/14.55 |
| 2013/0159433 A1* | 6/2013 | Chavan | G06Q 30/0241 709/206 |
| 2014/0052751 A1* | 2/2014 | Zhang | G06F 16/436 707/769 |
| 2014/0143682 A1* | 5/2014 | Druck | G06F 3/016 715/752 |
| 2015/0332332 A1* | 11/2015 | Al Darmaki | G06Q 30/0267 705/14.64 |

FOREIGN PATENT DOCUMENTS

| | | |
|---|---|---|
| JP | 2009-086854 A | 4/2009 |
| JP | 2018-25862 A | 2/2018 |
| KR | 10-2019-0079589 A | 7/2019 |
| TW | 200912787 A | 3/2009 |
| WO | 2008/154106 | 12/2008 |

\* cited by examiner

FIG.3

MEMBER DB 14a

| USER ID |
|---|
| NAME |
| DISPLAY NAME |
| TELEPHONE NUMBER |
| NUMBER OF POSSESSED POINTS |
| ⋮ |

ADVERTISEMENT PERMISSION INFORMATION DB 14b

| USER ID |
|---|
| PERMISSION STATE LIST |
| ⋮ |

CHAT DB 14c

| CHAT ID |
|---|
| USER ID |
| USER ID |
| CHAT HISTORY |
| ⋮ |

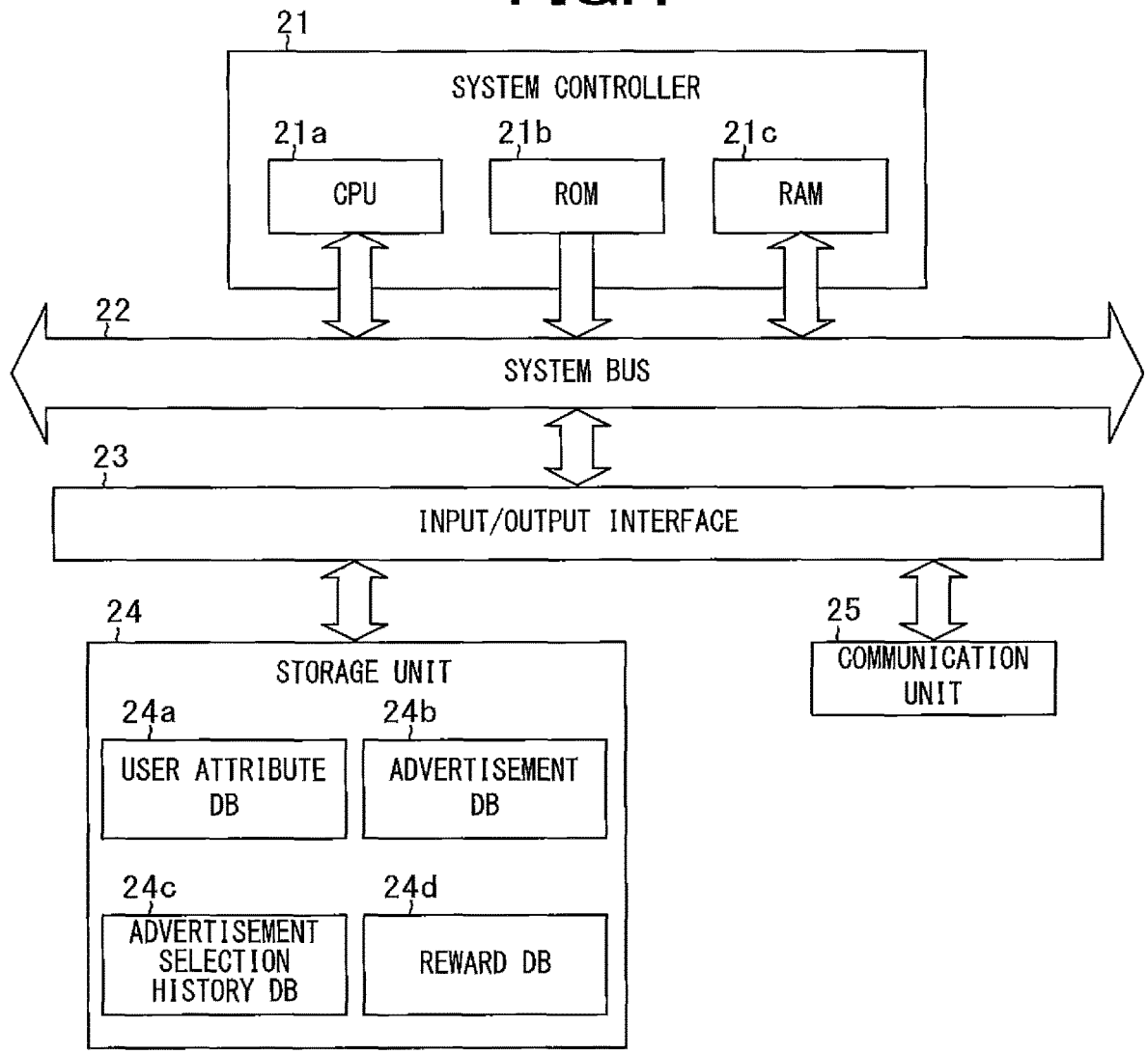

FIG.5

USER ATTRIBUTE DB 24a

| USER ID |
|---|
| USER ATTRIBUTE INFORMATION |

ADVERTISEMENT DB 24b

| ADVERTISEMENT ID |
|---|
| SERVICE ID |
| ADVERTISER ID |
| TRANSACTION TARGET ID |
| ADVERTISEMENT IMAGE |
| ADVERTISEMENT UNIT PRICE |
| LINK DESTINATION URL |
| ⋮ |

ADVERTISEMENT SELECTION HISTORY DB 24c

| TRACKING ID |
|---|
| SELECTION DATE AND TIME |
| ADVERTISEMENT ID |
| SERVICE ID |
| RCS-ID |
| CHAT ID |
| SELECTION USER ID |
| AFFILIATER ID |
| ⋮ |

REWARD DB 24d

| CONVERSION ID |
|---|
| CONVERSION-MADE DATE AND TIME |
| TRACKING ID |
| RCS-ID |
| CHAT ID |
| TRANSACTION USER ID |
| AFFILIATER ID |
| AFFILIATER REWARD AMOUNT |
| RCS REWARD AMOUNT |
| ⋮ |

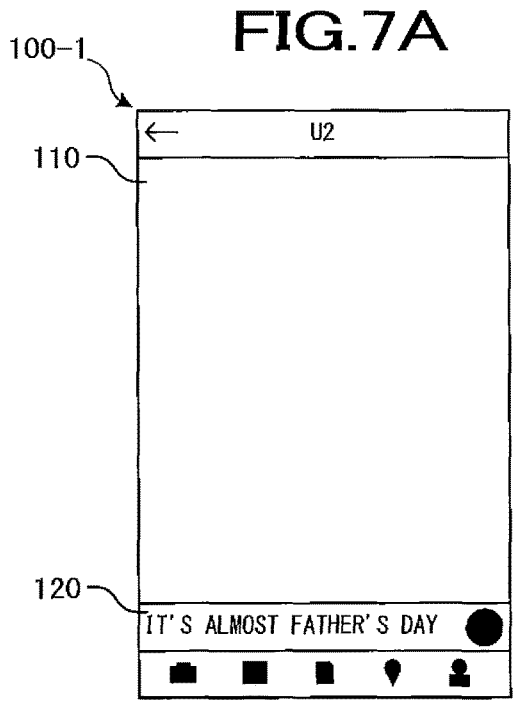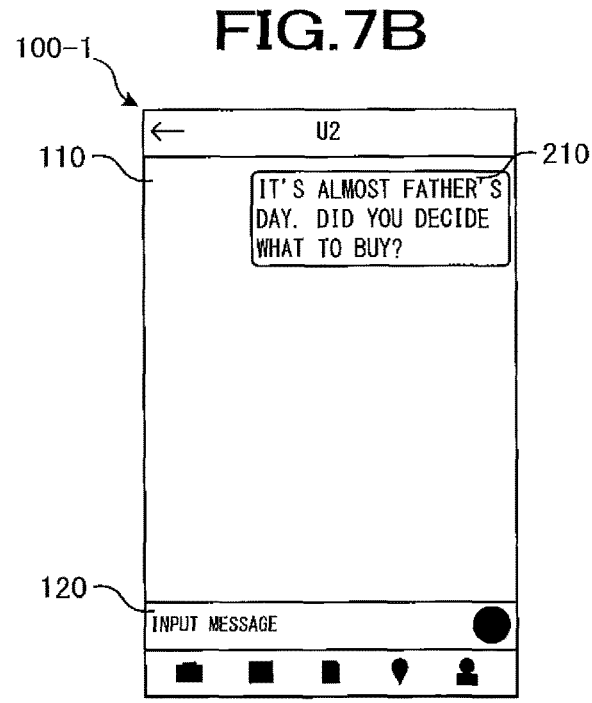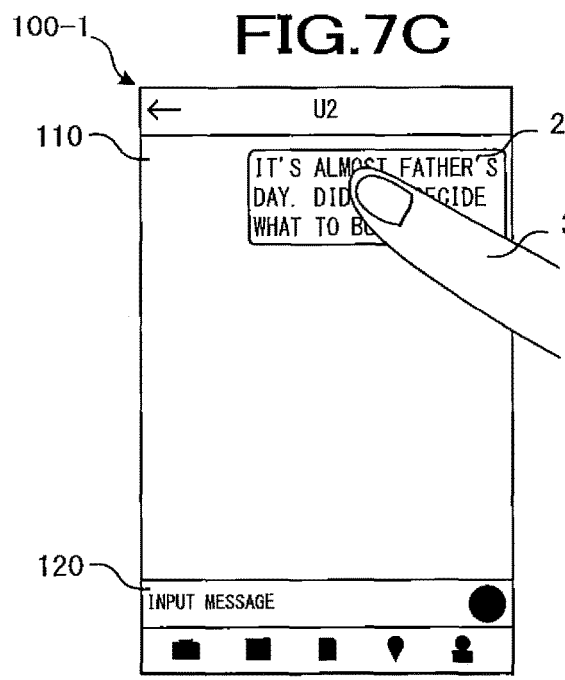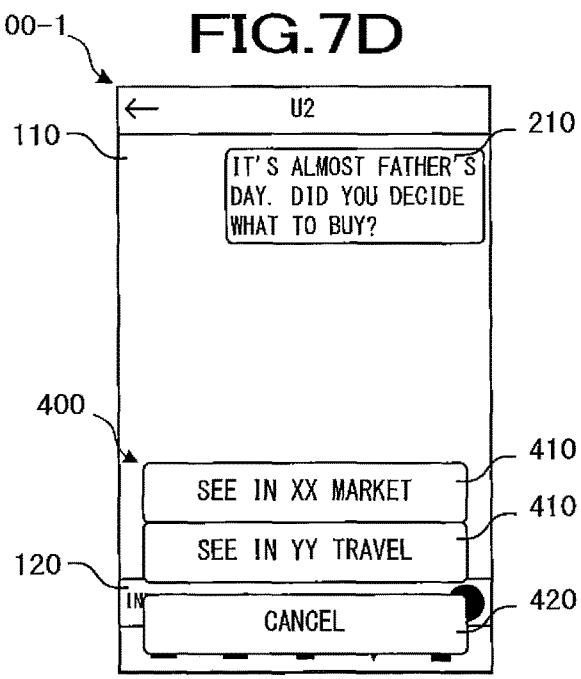

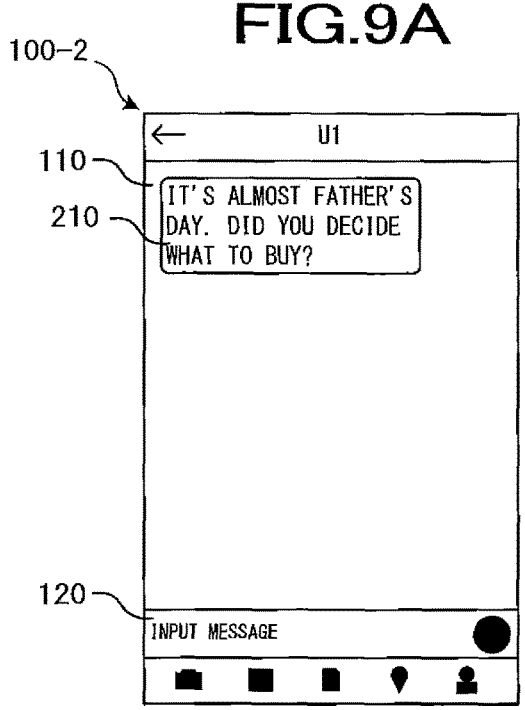
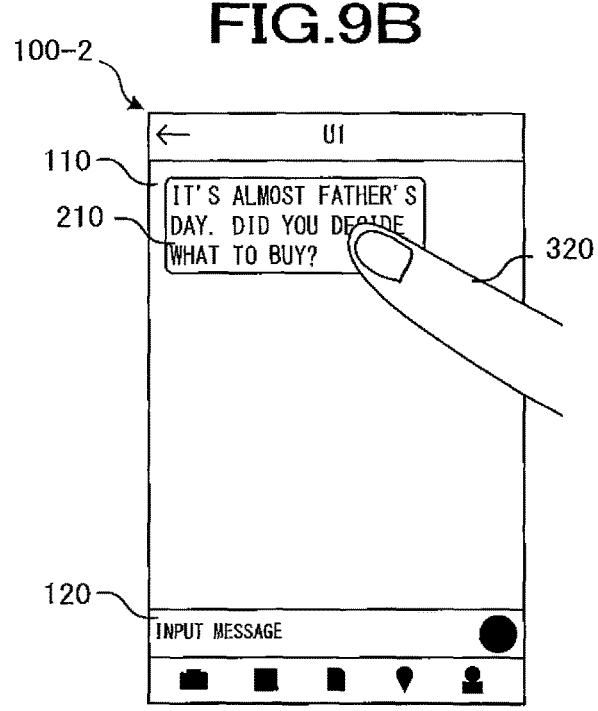
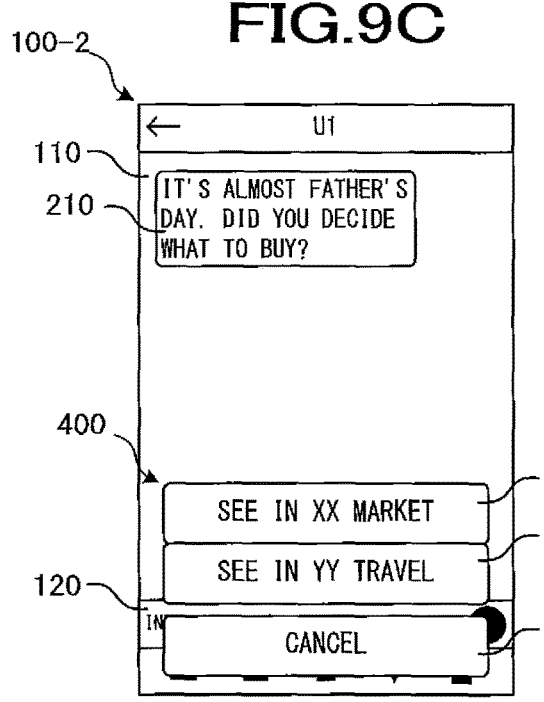
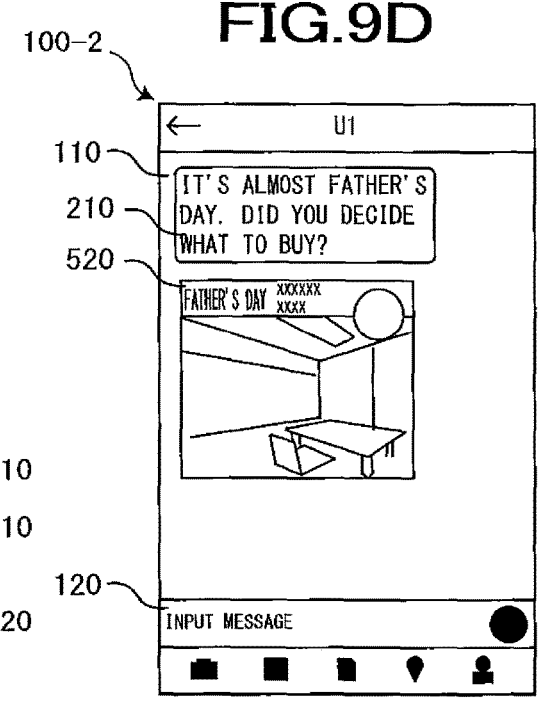

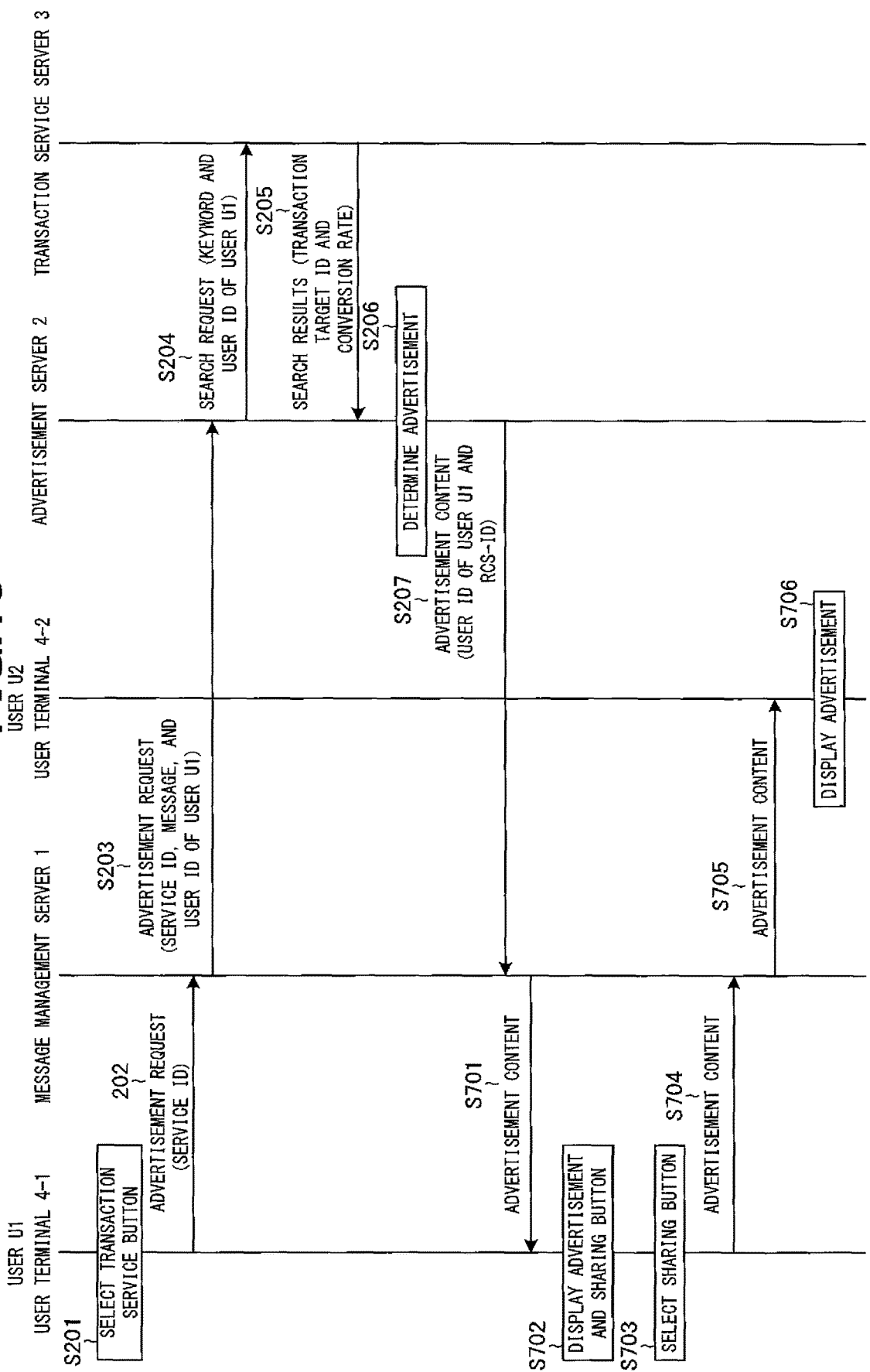

INFORMATION COMMUNICATION SYSTEM AND INFORMATION COMMUNICATION METHOD

CROSS-REFERENCE TO RELATED APPLICATION

This application claims priority to Japanese Patent Application No. 2021-20675 filed on Feb. 12, 2021, and the entire disclosure of which application including a specification, claims, drawings, and an abstract is incorporated herein by reference.

BACKGROUND

Technical Field

The present invention relates to a method for distributing an advertisement to terminal devices via a network.

Related Art

Conventionally, a system that distributes an advertisement through a network such as the Internet is known. In such a system, for example, the advertisement is displayed in content such as a web page and an e-mail. When a user selects the advertisement, for example, a terminal device of the user accesses a website in which information regarding an item for sale or a service corresponding to the advertisement is posted.

Furthermore, an affiliate advertisement is also known. For example, an affiliater creates and manages content of the website. The affiliater posts an advertisement in which a so-called affiliate link is embedded in the created content. When the user who views the content selects the advertisement, information for identifying the affiliater is recorded based on the affiliate link, and subsequent actions of the user is tracked. When the user takes an action such as ordering the item for sale corresponding to the advertisement or reserving the service corresponding to the advertisement, a reward will be given to the affiliater identified with the recorded information. For example, JP 2009-86854 A discloses a system that tracks a purchase route for an item for sale of a user who accesses the website based on an advertisement.

On the other hand, a rich communication service (RCS) and instant messaging are currently spreading. Generally, such a system provides a screen that displays exchanged messages to each of people with which the user exchanges messages. By using each screen, the user can exchange messages individually in real time like a chat. For example, JP 2006-191608 A discloses an instant messenger service system using a mobile communication terminal.

SUMMARY

It may be said that a message transmitted and received between the terminal devices is content created by a sender of the message. The transmitted message is displayed on both a screen of the terminal device used by the sender and a screen of the terminal device used by the receiver. Therefore, it is considered that there is a certain validity in distributing an advertisement suitable for each user to each terminal device according to transmission of the message. However, in the conventional systems, the advertisement cannot be distributed in such a manner.

The present invention has been made in view of the above points, and an example of an object of the present invention is to provide an information communication system and an information communication method that can distribute the advertisement suitable for each of the sender and the receiver of the message to the terminal device used by each of the sender and the receiver.

An aspect of the present invention is an information communication system comprising: at least one memory having computer program code stored thereon; and at least one processor configured to read the computer program code from the at least one memory and operate as instructed by the computer program code, the computer program code comprising: acquisition code configured to cause at least one of the at least one processor to acquire first user information indicating a first user and second user information indicating a second user based on transmission of a message from a first terminal device used by the first user to a second terminal device used by the second user; first transmission code configured to cause at least one of the at least one processor to transmit, to the first terminal device, a first advertisement corresponding to an attribute of the first user indicated by the acquired first user information; and second transmission code configured to cause at least one of the at least one processor to transmit, to the second terminal device, a second advertisement corresponding to an attribute of the second user indicated by the acquired second user information.

Another aspect of the present invention is an information communication method performed by at least one computer, the method comprising: acquiring first user information indicating a first user and second user information indicating a second user based on transmission of a message from a first terminal device used by the first user to a second terminal device used by the second user; transmitting, to the first terminal device, a first advertisement corresponding to an attribute of the first user indicated by the acquired first user information; and transmitting, to the second terminal device, a second advertisement corresponding to an attribute of the second user indicated by the acquired second user information.

BRIEF DESCRIPTION OF DRAWINGS

FIG. 3 is a diagram illustrating an example of information stored in a database of a message management server;

FIG. 4 is a block diagram illustrating an example of a schematic configuration of an advertisement server according to an embodiment;

FIG. 5 is a diagram illustrating an example of information stored in a database of an advertisement server;

FIGS. 7A to 7D are views illustrating examples of a screen transition;

FIGS. 9A to 9D are views illustrating examples of a screen transition;

FIG. 19 is a sequence diagram illustrating an example of an operation of an advertisement system according to an embodiment.

DETAILED DESCRIPTION

Hereinafter, embodiments of the present invention will be described in detail with reference to the drawings.

1. First Embodiment 1-1. Configuration of Advertisement System

Figure 1:
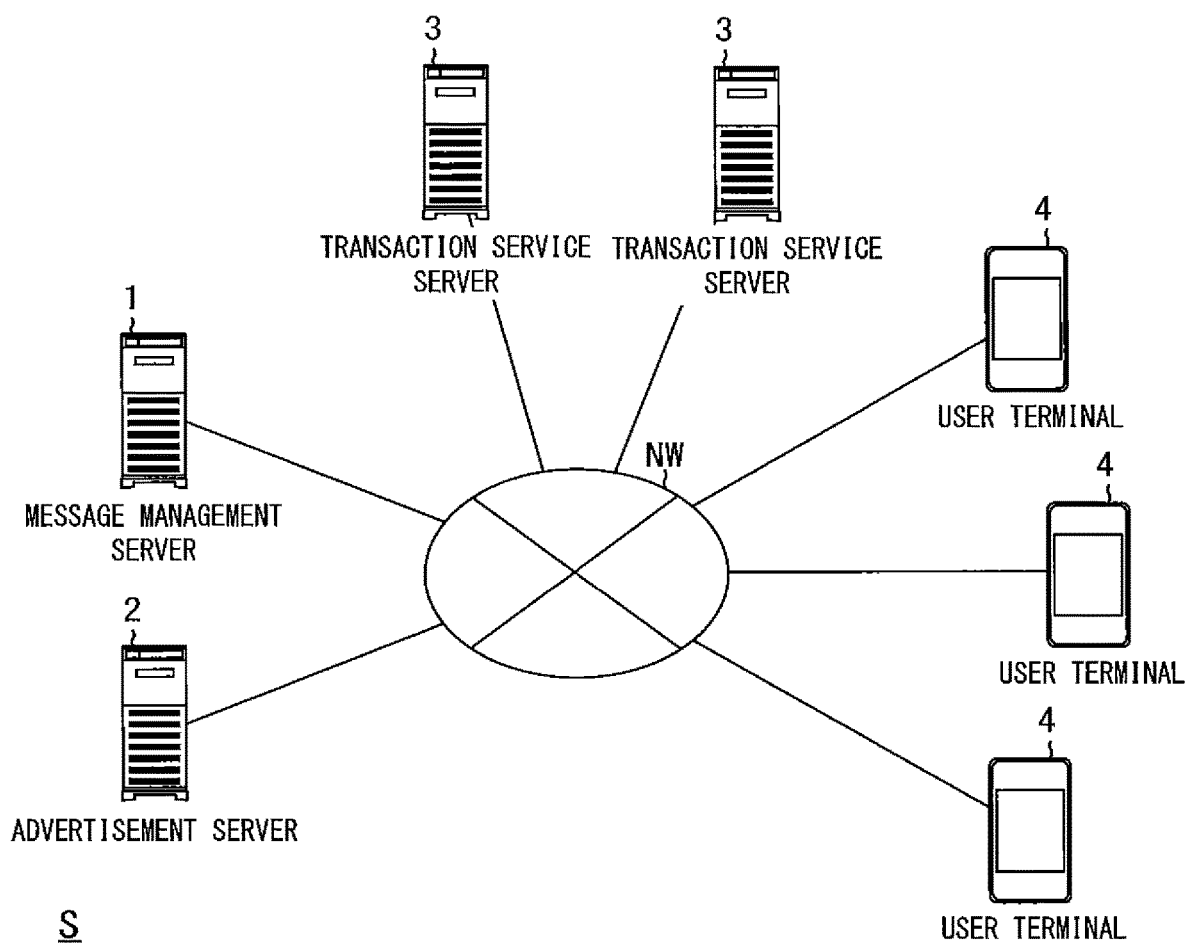
FIG. 1 is a diagram illustrating an example of a schematic configuration of an advertisement system according to an embodiment.

First, a configuration and a functional outline of an advertisement system S according to the present embodiment will be described with reference to FIG. 1. FIG. 1 is a diagram illustrating an example of a schematic configuration of the advertisement system S according to the embodiment.

As illustrated in FIG. 1, the advertisement system S includes a message management server 1, an advertisement server 2, one or more transaction service servers 3, and a plurality of user terminals 4. The message management server 1, the advertisement server 2, the transaction service servers 3, and the user terminals 4 are connected to each other via a network NW. The network NW is constructed by, for example, the Internet, a dedicated communication line (for example, a community antenna television (CATV) line), a mobile communication network (including a base station and the like), a gateway, and the like. A combination of the message management server 1 and the advertisement server 2 is an example of an information communication system.

The message management server 1 is a server device for providing an RCS. For example, when a user selects another person with which the user will exchange messages, the message management server 1 causes a chat screen to be opened. The person selected by the user is identified with a telephone number of this person. The chat screen may be a screen for two or more users to exchange private messages with each other. For example, messages transmitted and received between two or more user terminals 4 may be displayed on the chat screen. The chat screen may be a screen for a chat room. When receiving a message from the user terminals 4 of a user who opens a chat screen, the message management server 1 transfers the message to one or more user terminals 4 of one or more other users associated with the chat screen. Basically, the message management server 1 transfers a message in real time. The message management server 1 can also transfer image data, multimedia content, and other data. Furthermore, the message management server 1 acquires advertisement content corresponding to an attribute of a sender of a message from the advertisement server 2 based on transmission of the message from any of the user terminals 4, and transmits the advertisement content to the user terminal 4 that has transmitted the message. Furthermore, the message management server 1 acquires advertisement content corresponding to an attribute of a receiver of a message from the advertisement server 2 and transmits the advertisement content to the user 2 terminal 4 that has received the message.

The advertisement server 2 is a server device for providing an advertisement content to the message management server 1. For example, the advertisement server 2 may determine an advertisement according to an attribute of the user who transmits the message by using the RCS and/or the message. Furthermore, the advertisement server 2 may determine the advertisement by executing so-called a real-time bidding based on an advertisement unit price or the like presented from advertisers. The advertisement unit price is an advertisement rate paid to an advertisement provider that manages the message management server 1 by the advertiser for a successful result of the advertisement per one time. Note that the advertisement provider and a provider of the RCS may be the same or different. Furthermore, the advertisement server 2 may be also operated as an affiliate service provider. For example, in a case where the sender or the receiver of the message in the RCS selects an advertisement displayed on the user terminal 4 and then takes an action corresponding to a successful result of the advertisement (that is, in a case where the conversion is made), the advertisement server 2 may execute processing of giving a reward to the party that manages a system of RCS. Furthermore, for example, in a case where the receiver of the message in the RCS selects an advertisement displayed on the user terminal 4 and then takes an action corresponding to a successful result of the advertisement, the advertisement server 2 may execute processing of giving a reward to the sender of the message. Examples of the action corresponding to the successful result of the advertisement include purchase of an item for sale, purchase of a service, reservation of a service, a membership registration, a material request, reservation of an appointment, and the like. Examples of the reward to be given include legal currency, electronic money, points, and the like. The points can be used by using a predetermined point program. For example, in a case where an item for sale is purchased or a service is used by using a predetermined site or a real shop, the points can be used as purchase money or money for a service fee. Note that the advertisement server 2 may include a server device that provides an advertisement and a server device that executes processing related to an affiliate. These server devices may be connected to each other via a network such as a local area network (LAN).

Each transaction service server 3 is a server device for providing a transaction service for a user of the user terminal 4 to transact a transaction target. The transaction target may be a transaction object. Examples of the transaction target include an item for sale and a service. Each transaction service server 3 may perform processing related to a website that provides a transaction service. In a case where there are a plurality of transaction service servers 3, these transaction service servers 3 may provide transaction services different from each other. Examples of the transaction service or the website provided by the transaction service server 3 include online shopping, an online shopping mall, hotel reservation, book sales, beauty salon reservation, delivery reservation, provision of real estate information, and the like. Each transaction service server 3 distributes content of the advertiser of the advertisement to be distributed to the user terminals 4 to the user terminals 4, and enables an action corresponding to a successful result of the advertisement. At least one business operator among a plurality of business operators who sell an item for sale or a service by using the transaction service provided by the transaction service server 3 may be an advertiser. In a case where a transaction target of only a provider itself is handled in the transaction service, the provider may be an advertiser.

Each of the user terminals 4 is a terminal device that can be carried by a user who uses the RCS. Each of the user terminals 4 may have a telephone function. Examples of the user terminal 4 include a portable information terminal such as a smartphone, a tablet computer, a mobile phone, and a personal digital assistant (PDA). As the user terminal 4, a stationary terminal device such as a personal computer may be used. An application dedicated to RCS may be installed in each of the user terminals 4. Furthermore, a web browser may be installed in each of the user terminals 4.

1-2. Device Configuration 1-2-1. Configuration of Message Management Server

Figure 2:
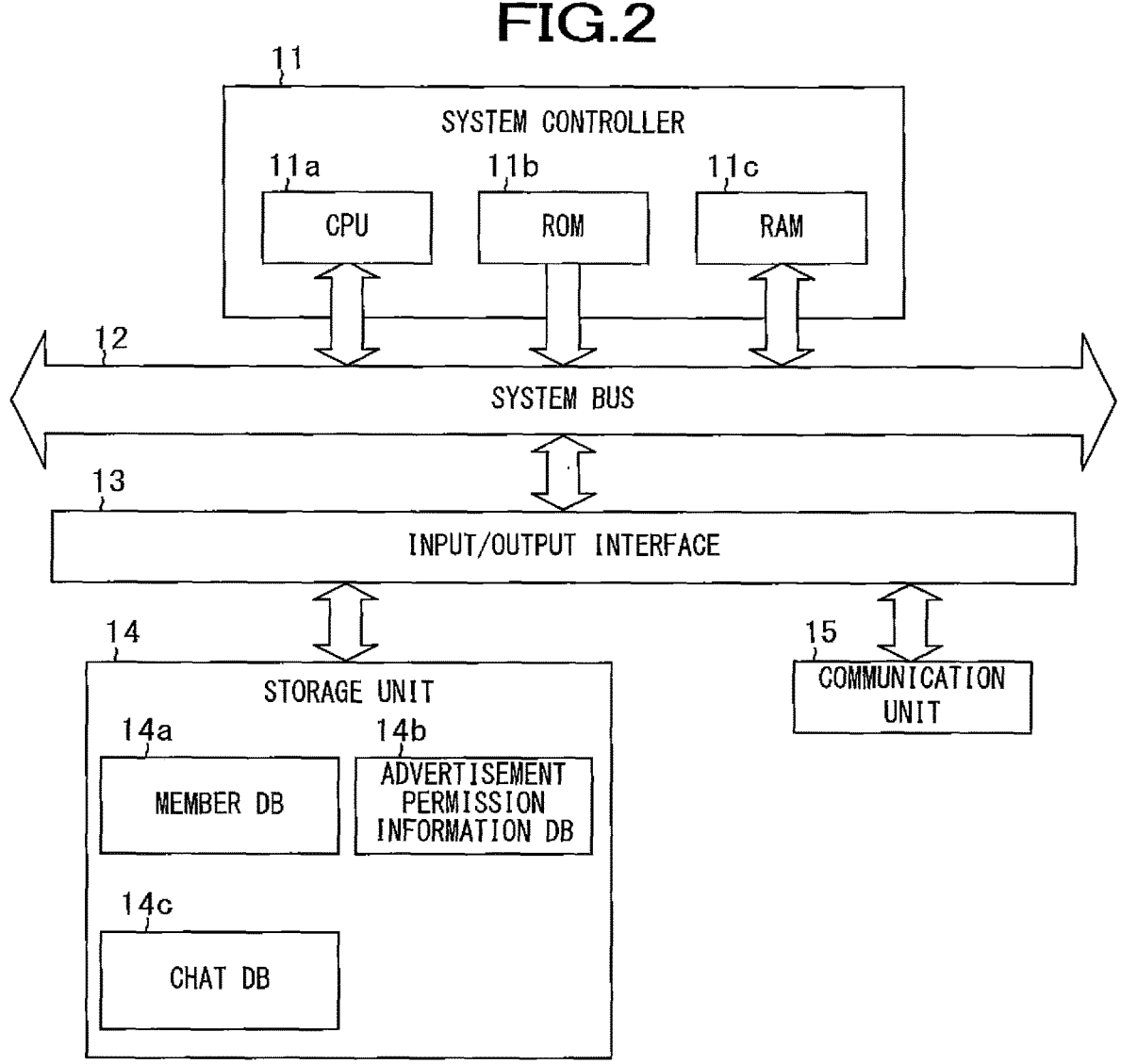
FIG. 2 is a block diagram illustrating an example of a schematic configuration of a message management server according to an embodiment.

Next, a configuration of the message management server 1 will be described with reference to FIGS. 2 and 3. FIG. 2 is a block diagram illustrating an example of a schematic configuration of the message management server 1 according to the embodiment. As illustrated in FIG. 2, the message management server 1 includes a system controller 11, a system bus 12, an input/output interface 13, a storage unit 14, and a communication unit 15. The system controller 11 and the input/output interface 13 are connected via the system bus 12.

The system controller 11 includes a central processing unit (CPU) 11a, a read only memory (ROM) 11b, and a random access memory (RAM) 11c.

The input/output interface 13 performs interface processing between the storage unit 14 and communication unit 15, and the system controller 11.

The storage unit 14 includes, for example, a hard disk drive or the like. The storage unit 14 stores databases such as a member DB 14a, an advertisement permission information DB 14b, and a chat DB 14c. "DB" is an abbreviation for database.

FIG. 3 is a diagram illustrating an example of information stored in the database of the message management server 1. In the member DB 14a, member information regarding a user who can use the RCS provided by the message management server 1 is stored for each user. For example, the member DB 14a stores, as the member information, a user ID, a name, a display name, a telephone number, the number of possessed points, and the like in association with each other. The user ID is identification information for identifying the user. The number of possessed points indicates the number of points currently possessed by the user.

In the advertisement permission information DB 14b, advertisement permission information indicating whether or not the user accepts the advertisement from the transaction service for each transaction service is stored for each user. Whether or not to accept the advertisement can be set by the user. Specifically, in the advertisement permission information DB 14b, the user ID and a permission state list are stored as the advertisement permission information in association with each other. The permission state list indicates whether or not the user indicated by the user ID accepts the advertisement for each transaction service.

In the chat DB 14c, chat information regarding a chat room created in the RCS is stored for each chat room. Specifically, in the chat DB 14c, a chat ID, a plurality of the user IDs, a chat history, and the like are stored in association with each other. The chat ID is identification information for identifying a target chat room. Each of the user IDs indicates a user who can enter the target chat room. Generally, the chat information includes user IDs for two persons. However, a chat room in which messages can be exchanged in a group of three or more persons may be capable of being created. In this case, the chat information includes user IDs for three or more persons. The chat history is a history of information exchanged in the chat room. For example, every time the information is transmitted, the chat history may include the information thereof, a user ID of the user who transmits the information, a transmission date and time for the information, and the like. Examples of the information to be transmitted include messages, images, multimedia data, and the like.

The storage unit 14 further stores various programs such as an operating system, a database management system (DBMS), and a message management server program. The message management server program is a program that causes the system controller 11 to execute various processing related to the RCS. For example, the message management server program may be acquired from other devices via the Internet NW, or may be recorded on a recording medium such as a magnetic tape, an optical disk, or a memory card, and read via a drive device.

The communication unit 15 includes, for example, a network interface card. The communication unit 15 is connected to the advertisement server 2, the transaction service server 3, and the user terminal 4 via the network NW, and controls a communication state with these devices.

1-2-2. Configuration of Advertisement Server

Next, a configuration of the advertisement server 2 will be described with reference to FIGS. 4 and 5. FIG. 4 is a block diagram illustrating an example of a schematic configuration of the advertisement server 2 according to the embodiment. As illustrated in FIG. 4, the advertisement server 2 includes a system controller 21, a system bus 22, an input/output interface 23, a storage unit 24, and a communication unit 25. The system controller 21 and the input/output interface 23 are connected via the system bus 22.

The system controller 21 includes a CPU 21a, a ROM 21b, a RAM 21c, or the like.

The input/output interface 23 performs interface processing between the storage unit 24 and communication unit 25, and the system controller 21.

The storage unit 24 includes, for example, a hard disk drive and the like. The storage unit 24 stores databases such as a user attribute DB 24a, an advertisement DB 24b, an advertisement selection history DB 24c, and a reward DB 24d.

FIG. 5 is a diagram illustrating an example of information stored in the database of the advertisement server 2. In the user attribute DB 24a, information indicating the attribute of the user who can use the RCS provided by the message management server 1 is stored for each user. Specifically, the user attribute DB 24a stores the user ID, user attribute information, and the like, in association with each other. The user attribute information indicates the attribute of the user indicated by the user ID. For example, for each transaction service, the user attribute information may indicate a click-through rate or a conversion rate about the target user through advertisements. The click-through rate in this case may be, for example, a ratio of the number of times the user selects the advertisement to the number of times the advertisement from a specific transaction service is displayed for the user in the RCS. The conversion rate in this case may be, for example, a ratio of the number of times the specific user takes an action corresponding to a successful result of the advertisement to the number of times the specific user visits the transaction service by selecting the advertisement from the specific transaction service in the RCS. The click-through rate or the conversion rate indicates a degree to which the user is interested in the transaction service, a degree to which the user likes the transaction service, a degree to which the user uses the transaction service, or a degree to which the user performs transaction in the transaction service. Therefore, it can be said that these information indicate the attribute of the user. The click-through rate and the conversion rate may be calculated by the advertisement server 2 by using, for example, the advertisement selection history DB 24c, the reward DB 24d, or the like. Furthermore, for example, the user attribute information may indicate age, gender, a residential area, an occupation, and the like of the user. These information may be input by the user from, for example, the application for RCS.

In the advertisement DB 24b, advertisement information regarding an advertisement to be distributed to the user terminals 4 of the users using the RCS is stored for each advertisement. Specifically, the advertisement DB 24b stores an advertisement ID, a service ID, an advertiser ID, a transaction target ID, an advertisement image, an advertisement unit price, a link destination uniform resource locator (URL), and the like in association with each other. The advertisement ID is identification information for identifying a target advertisement. The service ID is identification information for identifying the transaction service. The service ID included in the advertisement information indicates a transaction service in which a transaction target advertised by the target advertisement can be transacted. That is, the service ID indicates a transaction service to be an access destination of the user in a case where the target advertisement is selected. The advertiser ID is identification information for identifying the advertiser of the target advertisement. The transaction target ID is identification information for identifying a transaction target advertised by the target advertisement. The advertisement image is an image indicating the target advertisement. The advertisement unit price may be, for example, a cost per acquisition (CPA). The link destination URL is a URL of content of the web page or the like on which information of the transaction target advertised by the target advertisement is posted. When the user selects the advertisement, the user terminal 4 accesses and displays the content indicated by the link destination URL.

The advertisement selection history DB 24c stores a history of an advertisement selection by the user using the RCS. Specifically, the advertisement selection history DB 24c stores, as an advertisement selection log, a tracking ID, a selection date and time, the advertisement ID, the service ID, an RCS-ID, the chat ID, a selection user ID, an affiliater ID, and the like in association with each other every time an advertisement is selected. The tracking ID is identification information for tracking actions of the user after the advertisement is selected. The selection date and time indicates date and time when the advertisement is selected. The advertisement ID indicates the selected advertisement. The service ID indicates a transaction service in which a transaction target advertised by the selected advertisement can be transacted. The RCS-ID is identification information for identifying the RCS. The RCS-ID included in the advertisement selection log indicates which RCS the user uses to select an advertisement. In the advertisement system S, at least one RCS provided by the message management server 1 can be used. However, in the advertisement system S, a plurality of different RCSs may be provided by a plurality of the message management servers 1. Then, the user may be able to use one or more RCSs desired by the user among a plurality of the RCSs. The chat ID indicates a chat room screen that was open when an advertisement was selected. The selection user ID indicates the user who selects the advertisement. The affiliater ID is a user ID of a user to which a reward for a successful result is given in a case where the user who selects the advertisement takes an action corresponding to the successful result of the selected advertisement (in a case where the conversion is made).

In a case where the conversion is made by the user using the RCS, the reward DB 24d stores reward information regarding the reward given for the successful result of the advertisement every time the conversion is made. Specifically, the reward DB 24d stores a conversion ID, a conversion-made date and time, the tracking ID, the RCS-ID, the chat ID, a transaction user ID, the affiliater ID, an affiliater reward amount, an RCS reward amount, and the like in association with each other. The conversion ID is identification information for identifying the conversion. The conversion-made date and time indicates the date and time when the conversion is made. The tracking ID is identification information used for tracking the action corresponding to the successful result of the advertisement. The RCS-ID indicates an RCS that the user used when the user selected the advertisement, before the user took the action corresponding to the successful result of the advertisement. The chat ID indicates a chat room screen that was open when the user who took the action corresponding to the successful result of the advertisement selected the advertisement. The transaction user ID is a user ID of the user who took the action corresponding to the successful result of the advertisement. The affiliater ID is a user ID of a user to which the reward for the successful result of the advertisement is given. The affiliater reward amount indicates the amount of the reward given to the user indicated by the affiliater ID. The RCS reward amount indicates the amount of the reward given to the provider of the RCS indicated by the RCS-ID.

The storage unit 24 further stores various programs such as an operating system, a DBMS, and an advertisement server program. The advertisement server program is a program that causes the system controller 21 to execute various processing related to the provision of the advertisement and the affiliate. For example, the advertisement server program may be acquired from other devices via the Internet NW, or may be recorded on a recording medium such as a magnetic tape, an optical disk, or a memory card, and read via a drive device.

The communication unit 25 includes, for example, a network interface card. The communication unit 25 is connected to the message management server 1, the transaction service server 3, and the user terminal 4 via the network NW, and controls a communication state with these devices.

1-3. Functional Overview 1-3-1. Message Management Server

Figure 6:
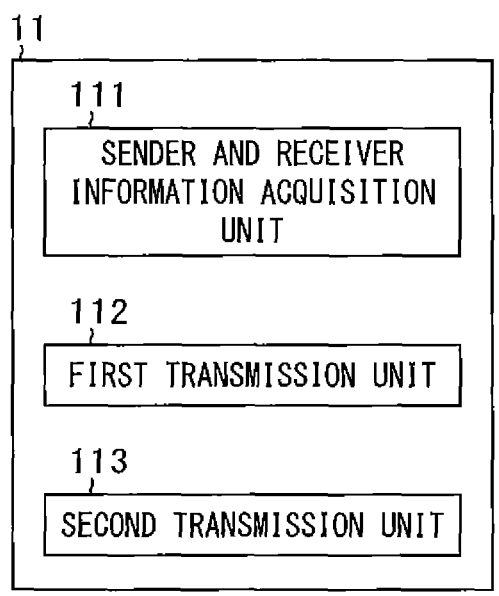
FIG. 6 is a diagram illustrating an example of a functional block of a system controller of a message management server.

Next, a functional overview of the system controller 11 in the message management server 1 will be described with reference to FIGS. 6 to 9D. FIG. 6 is a diagram illustrating an example of a functional block of the system controller 11 of the message management server 1. When the CPU 11a reads and executes various program codes included in the message management server program, the system controller 11 functions as a sender and receiver information acquisition unit 111, a first transmission unit 112, a second transmission unit 113 and so forth as illustrated in FIG. 6.

The sender and receiver information acquisition unit 111 acquires first user information indicating a first user and another second user information indicating a second user based on transmission of a message from a first user terminal 4 used by the first user to a second user terminal 4 used by the second user. Here, the first user is referred to as a user U1, and the second user is referred to as a user U2. Furthermore, the first user terminal 4 is referred to as a user terminal 4-1, and the second user terminal 4 is referred to as a user terminal 4-2. In a case where a group of three or more persons chats, there may be two or more user terminals 4-2.

Each of the first user information and the second user information may be, for example, the user ID. Since the message is transmitted with a protocol of the RCS, the message management server 1 receives the message input by the user U1 from the user terminal 4-1 and transmits the message to the user terminal 4-2. Here, the user terminal 4-1 may transmit the chat ID of the chat room corresponding to the chat screen displayed by the user terminal 4-1 to the message management server 1, together with the message. In this case, the sender and receiver information acquisition unit 111 may acquire, as the first user information and the second user information, two or more user IDs stored in the chat DB 14c in association with the chat ID received together with the message from the user terminal 4-1. As will be described later, in a case where an advertisement will be transmitted, based on selection of the transmitted or received message by a user, to the user terminal 4-1 or 4-2 of the user, the user terminal 4 may transmit the user ID of the user to the message management server 1 when the user selects the message. In this case, the sender and receiver information acquisition unit 111 may acquire the user ID received from the user terminal 4 as the first user information or the second user information.

The first transmission unit 112 transmits the advertisement corresponding to an attribute of the user U1 indicated by the first user information acquired by the sender and receiver information acquisition unit 111 to the user terminal 4-1. For example, the first transmission unit 112 may transmit the first user information to the advertisement server 2. As will be described later, the advertisement server 2 may transmit the advertisement corresponding to the attribute of the user U1 indicated by the first user information to the message management server 1. Examples of the advertisement corresponding to the attribute of the user will be described later.

When the message from the user terminal 4-1 is transferred to the user terminal 4-2, the first transmission unit 112 may transmit the advertisement to the user terminal 4-1. Alternatively, after transmitting the message, the first transmission unit 112 may transmit the advertisement to the user terminal 4-1 based on operation done by the user U1. Accordingly, the user U1 can determine whether or not to receive the advertisement. In the user terminal 4-1, the message input by the user U1 and transmitted from the user terminal 4-1 to the user terminal 4-2 is displayed on the chat screen on which messages exchanged between the user U1 and the user U2 is displayed. The message management server 1 may transmit the advertisement to the user terminal 4-1 when a message displayed on the message screen is selected by the user U1. The first transmission unit 112 may transmit the advertisement to the user terminal 4-1 only in a case where the latest message transmitted from the user terminal 4-1 is selected. Alternatively, the first transmission unit 112 may transmit the advertisement to the user terminal 4-1 even in a case where any message is selected, as long as the message has been transmitted from the user terminal 4-1.

The first transmission unit 112 may transmit the advertisement related to the message transmitted from the user terminal 4-1 to the user terminal 4-2 to the user terminal 4-1. For example, the first transmission unit 112 may transmit the advertisement related to the latest message. For example, the first transmission unit 112 may transmit the transmitted message to the advertisement server 2. In a case where the advertisement is to be transmitted based on selection, by the user U1, of a message from the chat screen, the first transmission unit 112 may transmit the selected message to the advertisement server 2. As will be described later, based on the message received from the message management server 1, the advertisement server 2 may transmit the advertisement related to the message to the message management server 1. Examples of the advertisement related to the message will be described later.

The first transmission unit 112 may transmit the advertisement to the user terminal 4-1 by using the same protocol as a protocol for transmitting the message from the user terminal 4-2 to the user terminal 4-1 in the RCS. Accordingly, the first transmission unit 112 may display the advertisement on the chat screen of the user terminal 4-1. Alternatively, the first transmission unit 112 may transmit the advertisement by using another protocol. Furthermore, the advertisement may be displayed on a screen other than the chat screen.

The second transmission unit 113 transmits the advertisement corresponding to an attribute of the user U2 indicated by the second user information acquired by the sender and receiver information acquisition unit 113 to the user terminal 4-2. The second transmission unit 113 may acquire the advertisement corresponding to the attribute of the user U2 by the same method as the method in the case of the first transmission unit 112. When the message from the user terminal 4-1 is transferred to the user terminal 4-2, the second transmission unit 113 may transmit the advertisement to the user terminal 4-2. Alternatively, after transmitting the message, the second transmission unit 113 may transmit the advertisement to the user terminal 4-2 based on operation done by the user U2. Furthermore, the second transmission unit 113 may transmit the advertisement related to the message transmitted from the user terminal 4-1 to the user terminal 4-2 to the user terminal 4-2. Furthermore, the second transmission unit 113 may transmit the advertisement to the user terminal 4-2 by using the same protocol as a protocol for transmitting the message from the user terminal 4-1 to the user terminal 4-2 in the RCS. Alternatively, the second transmission unit 113 may transmit the advertisement by using another protocol. These cases may also be similar to the case of the first transmission unit 112.

The advertisement transmitted to the user terminal 4-2 may be an advertisement in which the user U1 can receive the reward for the successful result. The second transmission unit 113 may transmit, to the user terminal 4-2, an advertisement with a user ID indicating the user U1 as a user to which the reward is given. Based on the user ID attached to the advertisement, the user to which the reward is given is identified as will be described later. For example, the second transmission unit 113 may transmit advertisement content as multimedia content. The advertisement content may include at least control data that can describe information, such as a hypertext markup language (HTML) document or a script, and an image of the advertisement. This control data may include a tag, an instruction, or the like that causes the user terminal 4-2 to display the image of the advertisement. Furthermore, the control data may include an affiliate link. The affiliate link may be a link for causing the user terminal 4 to access content of the transaction target corresponding to the advertisement in the transaction service in a case where the advertisement is selected, and for identifying a user to which the reward for the successful result is given in a case where an action corresponding to the successful result of the advertisement is taken. For example, the affiliate link may include the user ID of the user U1 and the link destination URL. The advertisement transmitted to the user terminal 4-2 may be an advertisement in which a provider (that is, the party managing the message management server 1) of an RCS system that transmitted the message from the user terminal 4-1 to the user terminal 4-2 can receive the reward for the successful result. In this case, the affiliate link may further include information for identifying the provider of the RCS. This information may be, for example, an RCS-ID or a chat ID of a chat room corresponding to a chat screen on which the message exchanged between the user U1 and the user U2 is displayed.

Next, an example of a screen transition related to an advertisement display will be described. FIGS. 7A to 9D are views illustrating examples of the screen transition. The user U1 selects the user U2 as a message transmission destination in the application for RCS. In response to this, the user terminal 4-1 displays a chat screen 100-1 as illustrated in FIG. 7A. The chat screen 100-1 includes a message display area 110, and a message input field 120. The message display area 110 is an area in which transmitted and received messages are displayed. The message input field 120 is an area for inputting a message. Here, the user U1 inputs a message in the message input field 120. For example, a message "It's almost Father's day. Did you decide what to buy?" is input. Then, the user U1 selects transmission of the message. In response to this, the user terminal 4-1 transmits the message and displays the input message 210 in the message display area 110 as illustrated in FIG. 7B. Here, the user U1 selects the message 210 with a finger 310 as illustrated in FIG. 7C. In response to this, the user terminal 4-1 displays a transaction service menu 400 on the chat screen 100-1 as illustrated in FIG. 7D. The transaction service menu 400 is a menu for selecting a transaction service for displaying an advertisement. The transaction service menu 400 includes one or more transaction service buttons 410 and a cancel button 420. Each of the transaction service buttons 410 may display a name of the transaction service corresponding to the button. Each of the transaction service buttons 410 is a button for displaying the advertisement from the transaction service corresponding to the button. For example, the transaction service button 410 may be displayed for all transaction services. Alternatively, the transaction service button 410 may be displayed for one or more transaction services corresponding to the attribute of the user U1. The cancel button 420 is a button for canceling the selection of the transaction service and not displaying the advertisement. Note that the message management server 1 may automatically determine the transaction service for acquiring the advertisement. In this case, when the message is selected, the user terminal 4-1 may display the advertisement without displaying the transaction service menu 400.

Figure 8:
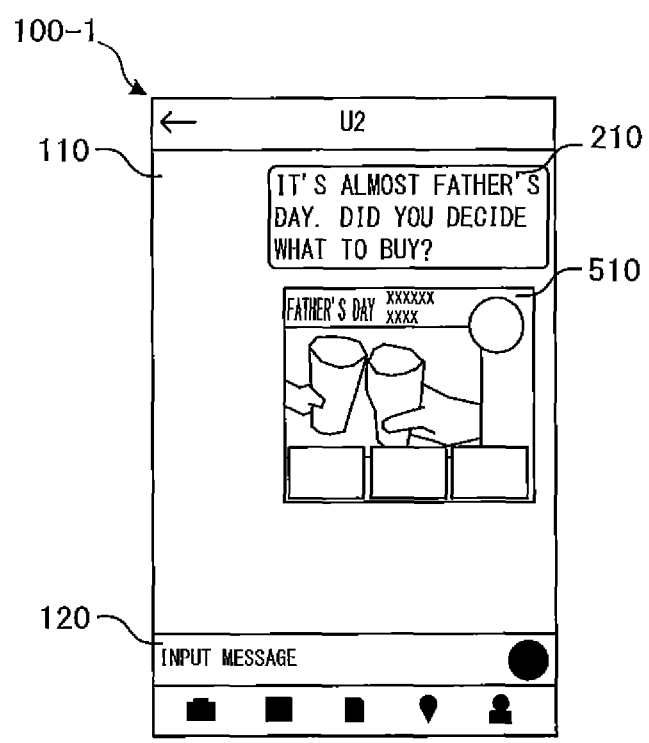
FIG. 8 is a view illustrating an example of a screen transition.

When the user U1 selects any of the transaction service buttons 410 from the transaction service menu 400, the user terminal 4-1 displays an advertisement 510 and a sharing button 520 as illustrated in FIG. 8. The advertisement 510 is an advertisement from the transaction service selected in the transaction service menu 400. Furthermore, the advertisement 510 may be an advertisement related to the message 210, for example, an advertisement related to Father's Day. Here, when the user U1 selects the advertisement 510, the user terminal 4-1 accesses the transaction service server 3 of the transaction service selected in the transaction service menu 400 according to the affiliate link, and displays content of a transaction target advertised by the advertisement 510, for example, a web page. For example, the user terminal 4-1 may display the content according to the web browser. Alternatively, in a case where the application for RCS provides a function of the web browser, the user terminal 4-1 may display the content according to the application. Thereafter, the user U1 can take an action corresponding to a successful result of the advertisement 510, such as purchase of an item for sale or reservation of a service. In response this action, the reward may be given to the provider of the RCS.

After the message is transmitted from the user terminal 4-1 to the user terminal 4-2, for example, the user U2 opens a chat screen 100-2 as illustrated in FIG. 9A. The chat screen 100-2 is a chat screen for displaying the messages exchanged between the user U2 and the user U1. Also, the chat screen 100-2 includes the message display area 110, and the message input field 120. As illustrated in FIG. 9A, the user terminal 4-2 displays a message 210 received from the user terminal 4-1 in the message display area 110 of the chat screen 100-2. Here, the user U2 selects the message 210 with a finger 320 as illustrated in FIG. 9B. In response to this, the user terminal 4-2 displays the transaction service menu 400 on the chat screen 100-2 as illustrated in FIG. 9C. In the transaction service menu 400, the transaction service buttons 410 may be displayed for all transaction services. Alternatively, the transaction service button 410 may be displayed for one or more transaction services corresponding to the attribute of the user U2.

When the user U2 selects any of the transaction service buttons 410 from the transaction service menu 400, the user terminal 4-2 displays an advertisement 520 as illustrated in FIG. 9D. The advertisement 520 is an advertisement from the transaction service selected in the transaction service menu 400. Furthermore, the advertisement 520 may be an advertisement related to the message 210, for example, an advertisement related to Father's Day. Here, when the user U2 selects the advertisement 520, the user terminal 4-2 accesses the transaction service server 3 of the transaction service selected in the transaction service menu 400, and displays content of a transaction target advertised by the advertisement 520. Thereafter, when the user U2 may take an action corresponding to the successful result of the advertisement 510, the reward is given to the provider of the RCS. Furthermore, the reward may also be given to the user U1.

1-3-2. Advertisement Server

Figure 10:
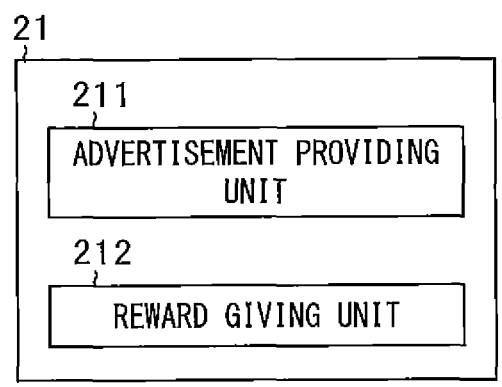
FIG. 10 is a diagram illustrating an example of a functional block of a system controller of an advertisement server.

Next, a functional overview of the system controller 21 of the advertisement server 2 will be described with reference to FIG. 9. FIG. 10 is a diagram illustrating an example of a functional block of the system controller 21 of the advertisement server 2. By the CPU 21*a* reads and executes various program codes included in the advertisement server program, the system controller 21 functions as an advertisement providing unit 211, and a reward giving unit 212 as illustrated in FIG. 10.

The advertisement providing unit 211 acquires an advertisement to be provided to the message management server 1 as the advertisement to be transmitted from the message management server 1 to the user terminal 4. Specifically, the advertisement providing unit 211 acquires an advertisement corresponding to an attribute of a target user (the user U1 or U2) as the advertisement to be transmitted to the user terminal 4.

Examples of the advertisement corresponding to the attribute of the user include, for example, an advertisement of a transaction target the user is estimated to be interested in, an advertisement of a transaction target having a high purchase frequency of the user, an advertisement of a transaction target in a transaction service having a high use frequency of the user, and an advertisement in which the attribute of the user matches with a condition designated by the advertiser. For example, the advertisement providing unit 211 may determine an advertisement to be provided based on the user attribute information of the target user stored in the user attribute DB 24a. For example, in a case where the user attribute information indicates a conversion rate for each transaction service for the target user, the advertisement providing unit 211 may determine the transaction service having a relatively high conversion rate. Then, the advertisement providing unit 211 may acquire the content of the advertisement associated with the service ID of the determined transaction service from the advertisement DB 24b.

Furthermore, for example, for each advertisement, the advertisement DB 24b may store a condition of the attribute of users to whom the advertisement is presented. This condition may include, for example, gender, age, a residential area, an occupation, and the like. This condition may be set by the advertiser. In this case, the advertisement providing unit 211 may acquire data of the advertisement in which the attribute indicated by the user attribute information meets the condition from the advertisement DB 24b.

Furthermore, for example, the advertisement providing unit 211 may acquire information regarding a transaction target corresponding to the attribute of the user U1 from the transaction service server 3. Then, the advertisement providing unit 211 may determine an advertisement to be provided based on the acquired information. For example, the advertisement providing unit 211 may transmit information for identifying the target user in the transaction service server 3 to the transaction service server 3. The transaction service server 3 may transmit information regarding a transaction target corresponding to the attribute of the user indicated by the transmitted information to the advertisement server 2. The information for identifying the user may be, for example, a user ID in the RCS. In a case where the information for identifying the target user in the transaction service server 3 is different from the user ID in the RCS, the information and the user ID may be stored in the storage unit 14 in association with each other. In this case, the advertisement providing unit 211 may transmit the information associated with the user ID of the target user to the transaction service server 3. In the transaction service server 3, for each user who uses the corresponding transaction service, a conversion rate about the user may be stored for each transaction target, for each category of the transaction target, or for each advertiser. The conversion rate in this case may be, for example, a ratio of the number of times the user takes an action corresponding to the successful result of the advertisement of the transaction target (or any transaction target belonging to the category of the transaction target, or any transaction target handled by an advertiser that sells the transaction target) corresponding to the advertisement, to the number of times the user visits the transaction service by selecting the advertisement. For example, the transaction service server 3 may calculate the conversion rate as needed. This conversion rate may be calculated in consideration of not only the advertisement displayed in the RCS but also the advertisement displayed in other systems. The transaction service server 3 may determine one or more transaction targets having a relatively high conversion rate. The transaction service server 3 may transmit the transaction target ID of the determined transaction target to the message management server 1. At this time, the transaction service server 3 may transmit the conversion rate corresponding to the transaction target ID together with the transaction target ID.

The advertisement providing unit 211 may acquire the advertisement related to the message transmitted from the user terminal 4-1 to the user terminal 4-2. The advertisement related to the message may be, for example, an advertisement of the transaction target or the advertiser related to the message or a word included in the message, or the advertisement itself may be an advertisement related to the message or the word. For example, the advertisement providing unit 211 may divide the message into morphemes by using morphological analysis. Then, the advertisement providing unit 211 may extract, for example, a noun and the like among the morphemes as a keyword. Furthermore, for example, the advertisement DB 24b may store, for each advertisement, keywords related to the advertisement, the advertiser, or the transaction target. These keywords may be set by, for example, the advertiser. Then, the advertisement providing unit 211 may acquire the content of the advertisement associated with at least one keyword matching with the at least one keyword included in the transmitted message from the advertisement DB 24b. Alternatively, by transmitting the message transmitted from the user terminal 4-1 to the user terminal 4-2 or the at least one keyword included in the message to the transaction service servers 3, the advertisement providing unit 211 may acquire the advertisement related to the message from the transaction service servers 3. For example, the transaction service server 3 may store, for each transaction target, content information indicating content such as a web page that can be distributed to the user terminal 4. The content information may include, for example, a name or a title of each transaction target and information regarding a text described in the content. The content information may be, for example, an HTML document or the like for displaying the web page. For example, the transaction service server 3 may search for one or more transaction targets on which the content information includes the at least one keyword transmitted from the advertisement server 2. Then, the transaction 2 service server 3 may transmit the transaction target ID of the found transaction target to the message management server 1.

In a case where there is a plurality of candidates for the advertisement to be provided to the message management server 1, the advertisement providing unit 211 may determine the advertisement to be provided by executing, for example, so-called real-time bidding. For example, the message management server 1 may acquire an advertisement unit price for each of the candidates from the advertisement. DB 24b and determine the advertisement having the highest advertisement unit price as the advertisement to be provided. In a case where the conversion rate is acquired for each advertisement from the transaction service server 3, the advertisement providing unit 211 may determine the advertisement to be provided based on the advertisement unit price and the conversion rate. For example, the advertisement providing unit 211 may calculate a score by substituting the advertisement unit price and the conversion rate into a predetermined calculation formula. Then, the advertisement providing unit 211 may determine the advertisement having the highest score as the advertisement to be provided. For example, the advertisement providing unit 211 may calculate the score so that the higher the advertisement unit price, the higher the score, and the higher the conversion rate, the higher the score.

When the advertisement is determined, the advertisement providing unit 211 may attach the user ID of the user U1 to the advertisement and transmit the advertisement to the message management server 1. For example, the advertisement providing unit 211 may generate control data for displaying the advertisement. The advertisement providing unit 211 may transmit the advertisement content including the control data and the advertisement image. The control data may include a tag or an instruction for displaying the image of the advertisement. Furthermore, the control data may include the affiliate link. The affiliate link may include the user ID of the user U1, the advertisement ID corresponding to the determined advertisement, and the link destination URL. Furthermore, the affiliate link may include at least one of the RCS-ID or the chat ID. Furthermore, for example, the affiliate link may include a URL assigned to the advertisement server 2. In this case, when the user selects the advertisement, the affiliate link may be generated so that the user terminal 4 first accesses the advertisement server 2. The advertisement server 2 redirects the access from the user terminal 4, so that the user terminal 4 accesses information indicated by the link destination URL.

The reward giving unit 212 may execute processing of giving a reward to the user U1 based on recognition that the user U2 takes an action corresponding to the successful result of the advertisement after the user U2 selects the advertisement transmitted to the user terminal 4-2 by the second transmission unit 113 of the message management server 1. It may be said that a message transmitted and received between the user terminals 4 is content created by a sender of the message. Therefore, it is considered that there is a certain validity in giving a reward to the user U1 who is the sender of the message. To the advertisement transmitted by the second transmission unit 113, the user ID of the user U1 is added as the affiliater ID. According to selection of the advertisement by the target user, the user ID added to the advertisement is transmitted from the user terminal 4-2 and stored. Thereafter, in response to the action taken by the user U2 corresponding to the successful result of the advertisement, the reward giving unit 212 may acquire the stored user ID and identify the user to which the reward is given based on the acquired user ID.

For example, the user ID of the user U1 may be transmitted from the user terminal. 4-2 to the advertisement, server 2. For example, the user terminal 4-2 accesses the advertisement server 2 according to the affiliate link included in the advertisement. At this time, the reward giving unit 212 may acquire the user ID of the user U1. The reward giving unit 212 may store the acquired user ID in the advertisement selection history DE 24c as the affiliater 1D. Alternatively, the reward giving unit 212 may transmit the acquired user ID to the user terminal 4-2 as a cookie of the advertisement server 2. Accordingly, the user ID of the user U1 may be stored in the user terminal 4-2. The reward giving unit 212 may generate a new tracking ID and store the tracking ID in the advertisement selection history DB 24c in association with the user ID of the user U1. Then, the reward giving unit 212 may transmit a response including the tracking ID to the user terminal 4-2. Accordingly, the reward giving unit 212 may transmit a request including the tracking ID from the user terminal 4-2 to the transaction service servers 3 by performing the redirect. Then, the tracking ID may be stored by the transaction service server 3. Alternatively, the tracking ID may be transmitted to the user terminal 4-2 as a cookie of the transaction service server 3 and stored in the user terminal 4-2. In the transaction service, when the user completes the action corresponding to the successful result of the advertisement, a thanks page is displayed. The thanks page is one of the contents. Information for notifying the advertisement server 2 that the conversion is made is embedded in the thanks page. The information to be embedded may be, for example, a so-called conversion tag or a program. When the target user takes the action corresponding to the successful result of the advertisement, the transaction service server 3 transmits the thanks page to the user terminal 4-2. The user terminal 4-2 transmits the tracking ID stored in the transaction service server 3 or the user terminal 4-2 to the advertisement server 2 according to the information included in the thanks page. The reward giving unit 212 acquires the advertisement selection log associated with the tracking ID received from the user terminal 4-2. Accordingly, the reward giving unit 212 may recognize that the action corresponding to the successful result of the advertisement is taken. The reward giving unit 212 acquires the affiliater ID from the acquired advertisement selection log. The reward giving unit 212 may identify the user to which the reward is given based on the affiliater ID. Alternatively, the user ID of the user U1 included in the advertisement may be transmitted from the user terminal 4-2 to the transaction service server 3. Then, the user ID may be stored in the transaction service server 3 or may be stored as a cookie in the user terminal 4-2. Then, when the user terminal 4-2 displays the thanks page, the user terminal 4-2 may transmit the stored user ID to the advertisement server 2. Furthermore, in a case where the target user takes the action corresponding to the successful result of the advertisement, the transaction service server 3 may transmit the tracking ID to the advertisement server 2 instead that the user terminal 4 transmits the tracking ID to the advertisement server 2.

When the user U1 to which the reward is given is identified, the reward giving unit 212 executes processing of giving the reward to the user U1. For example, the reward giving unit 212 may determine a predetermined ratio of the advertisement unit price of the corresponding advertisement as the reward amount. In a case where the reward is a point, the reward giving unit 212 may add the number of points corresponding to the reward amount to the number of possessed points of the user U1. In a case where the reward is given by legal currency, information regarding a savings account of each user may be stored in the member DB 14a. For example, the reward giving unit 212 may access the online system of the bank, and may remit the savings currency corresponding to the reward amount from the savings account of the transaction service in which the conversion is made, the savings account of the advertiser, or the savings account of the advertisement distributor that manages the advertisement server 2 to the savings account of the user U1 based on the information regarding the savings account of the user U1. The reward may be given in real time or periodically (for example, every month).

The reward giving unit 212 may execute processing of giving the reward to the party managing the RCS system through which the message is transmitted from the user terminal 4-1 to the user terminal 4-2, based on at least one of recognition that the user U1 takes an action corresponding to the successful result of the advertisement transmitted by the first transmission unit 112 of the message management server 1 to the user terminal 4-1 after the user U2 selects the advertisement, and recognition that the user U2 takes an action corresponding to the successful result of the advertisement transmitted by the second transmission unit 113 of the message management server 1 to the user terminal 4-2 after the user U2 selects the advertisement. The application for RCS or the chat screen has a function as an advertisement medium. It is considered to be reasonable to give the reward to the provider of the advertisement medium. In this case, the reward is distributed to the user U1 and the managing party. The advertisement transmitted from message management server 1 may include information indicating a managing party of the RCS. This information may be at least one of the RCS-ID or the chat ID. The information indicating the managing party of the RCS may be stored in the advertisement server 2, the transaction service server 3, or the user terminal 4 by the same method as the method using the user ID of the user U1. Then, the reward giving unit 212 may identify the managing party to which the reward is given by the same method as the method using the user ID of the user U1. In the case of the chat ID, the reward giving unit 212 may transmit, for example, an inquiry including the chat ID to each message management server 1. Each message management server 1 may search the chat DB 14c for the chat ID included in the inquiry, and transmit a response indicating the presence or absence of the chat ID to the advertisement server 2. The reward giving unit 212 may identify the managing party of the RCS to which the reward is given based on the response from each message management server 1.

1-4. Operation of Advertisement System

Next, an operation of the advertisement system S will be described with reference to FIGS. 11 to 16. FIGS. 11 to 16 are sequence diagrams illustrating an example of the operation of the advertisement system S according to the embodiment.

Figure 11:
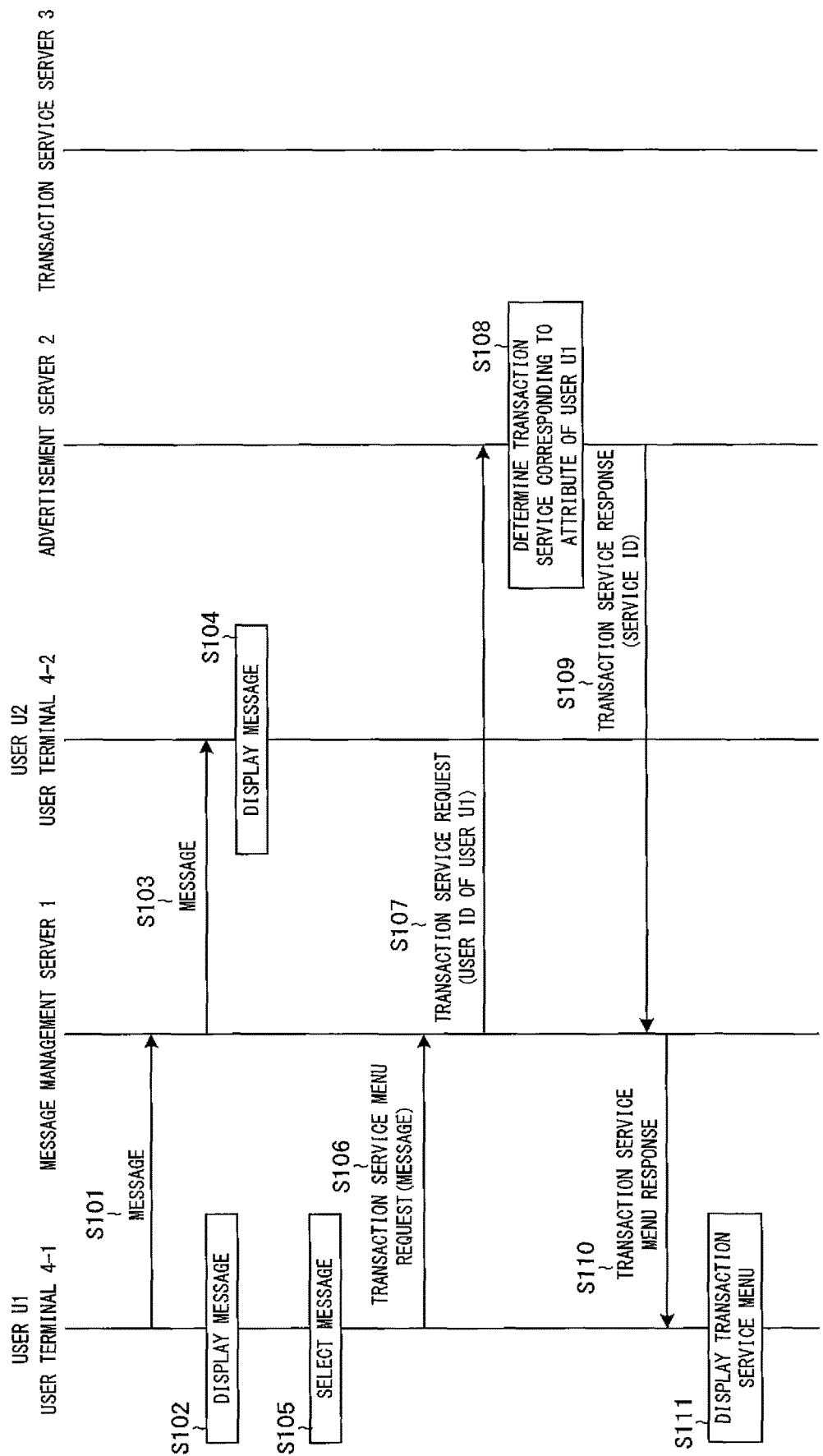
FIG. 11 is a sequence diagram illustrating an example of an operation of an advertisement system according to an embodiment.

The user U1 inputs the message to the message input field 120 of the chat screen 100-1 and selects transmission. In response to this, as illustrated in FIG. 11, the user terminal 4-1 transmits the input message and the chat ID of the chat room corresponding to the chat screen 100-1 to the message management server 1 (Step S101). Furthermore, the user terminal 4-1 displays the transmitted message to the message display area 110 (Step S102). The message management server 1 acquires the user ID stored in the chat DB 14c in association with the chat ID received from the user terminal 4-1. The message management server 1 identifies the user U2 that is the transfer destination of the message based on the acquired user ID. The message management server 1 transfers the message received from the user terminal 4-1 and the chat ID to the user terminal 4-2 used by the user U2 (Step S103). The user terminal 4-2 that has received the message and the chat ID displays the message in the message display area of the chat screen 100-2 corresponding to the chat ID (Step S104).

hereafter, the user U1 selects the message displayed on the chat screen 100-1 (Step S105). In response to this, the user terminal 4-1 transmits a transaction service menu request including the selected message to the message management server 1 (Step S106). The first transmission unit 112 of the message management server 1 that has received the transaction service menu request transmits the transaction service request including the user ID of the user U1 to the advertisement server 2 (Step S107). The advertisement providing unit 211 of the advertisement server 2 acquires the user ID from the transaction service request received from the message management server 1. Then, the advertisement providing unit 211 determines the transaction service corresponding to the attribute of the user indicated by the user ID (Step S108). For example, the advertisement providing unit 211 extracts the transaction service in which the user U1 accepts the advertisement with reference to the advertisement permission information stored in the advertisement permission information DB 1.4b in association with the user ID. Furthermore, the advertisement providing unit 211 acquires the user attribute information stored in the user attribute DB 24a in association with the user ID. The advertisement providing unit 211 compares the conversion rates in the extracted transaction services with each other based on the user attribute information. For example, the advertisement providing unit 211 may determine the transaction service having the highest conversion rate. Alternatively, the advertisement providing unit 211 may determine one or more transaction services of which the conversion rate is a predetermined value or greater. The advertisement providing unit 211 transmits a transaction service response including the service ID of the determined transaction service to the message management server 1 (Step S109). The first transmission unit 112 of the message management server 1 that has received the transaction service response generates data for displaying the transaction service menu 400 including the transaction service buttons 410 indicated by the service ID included in the transaction service response. The first transmission unit 112 transmits a transaction service menu response including the generated data to the user terminal 4-1 (Step S110). The user terminal. 4-1 displays the transaction service menu 400 on the screen according to the transaction service menu response received from the message management server 1 (Step S1.11).

Figure 12:
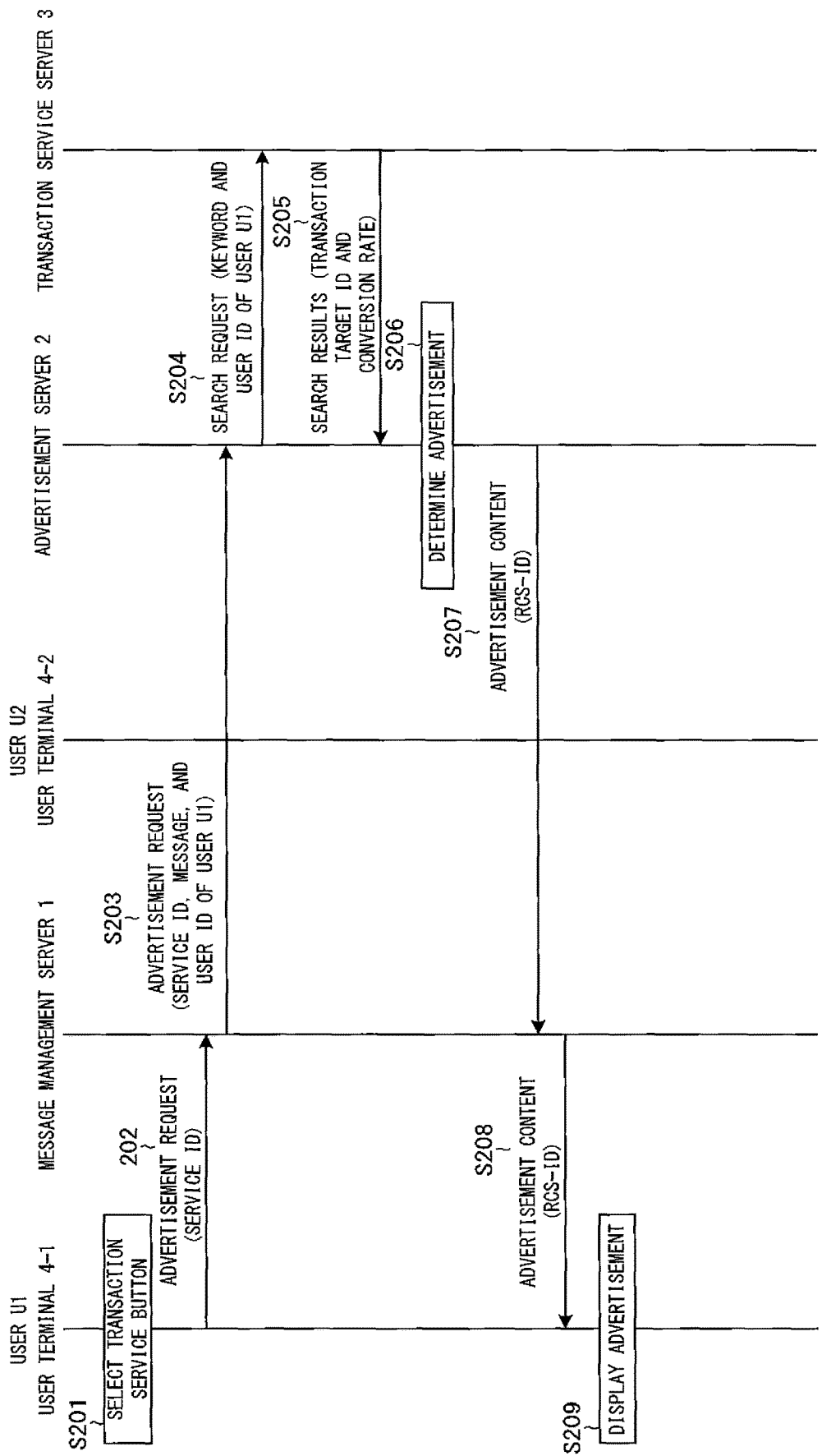
FIG. 12 is a sequence diagram illustrating an example of an operation of an advertisement system according to an embodiment.

Thereafter, as illustrated in FIG. 12, the user U1 selects any of the transaction service buttons 410 from the transaction service menu 400 (Step S201). In response to this, the user terminal 4-1 transmits an advertisement request including the service ID of the transaction service corresponding to the selected transaction service button 410 to the message management server 1 (Step 3202). The first transmission unit 112 of the message management server 1 acquires the service ID from the advertisement request received from the user terminal 4-1. Then, the first transmission unit 112 transmits the advertisement request including the service ID, the message received from the user terminal 4-1 in Step S106, the user ID of the user U1, and the chat ID of the chat room corresponding to the chat screen 100-1 of the user terminal 4-1 to the advertisement server 2 (Step 3203). The advertisement providing unit 211 of the advertisement server 2 acquires the service ID, the message, and the user ID from the advertisement request received from the message management server 1. The advertisement providing unit 211 extracts at least one keyword from the message. Then, the advertisement providing unit 211 transmits a search request including the at least one keyword and the user ID to the transaction service server 3 corresponding to the service ID acquired from the advertisement request (Step S204). The transaction service server 3 acquires the at least one keyword from the search request received from the message management server. For example, the transaction service server 3 searches for the transaction target associated with content information including the at least one keyword among transaction targets for which the advertisement is provided to the advertisement system S, in the transaction service corresponding to the transaction service server 3. For each found transaction target, the transaction service server 3 acquires the conversion rate of the user indicated by the user ID included in the search request. Then, the transaction service server 3 extracts one or more transaction targets having a relatively high conversion rate from among the found transaction targets. The transaction service server 3 transmits the search results including the transaction target IDs of the extracted transaction targets and the conversion rates to the advertisement server 2 (Step S205).

The advertisement providing unit 211 of the advertisement server 2 that has received the search results determines the advertisement to be provided to the message management server 1 (Step S206). For example, the advertisement providing unit 211 acquires the advertisement unit price associated with the transaction target ID included in the search results from the advertisement DB 24*b*. Then, the advertisement providing unit 211 determines the advertisement based on the advertisement unit price and the conversion rate included in the search results. Next, the advertisement providing unit 211 generates content of the determined advertisement. For example, the advertisement providing unit 211 acquires the advertisement ID, the service ID, and the advertisement image of the determined advertisement from the advertisement DB 24*b*. The advertisement providing unit 211 generates the affiliate link including the advertisement ID, the service ID, the link destination URL, the user ID of the user U1, the RCS-ID of the message management server 1 that has transmitted the advertisement request, and the chat ID of the chat room corresponding to the chat screen 100-1 of the user terminal 4-1. Furthermore, the advertisement providing unit 211 generates the control data including a tag or an instruction for displaying the advertisement image. The advertisement providing unit 211 transmits the advertisement content including the control data and the advertisement image to the message management server 1 (Step S207). The first transmission unit 112 of the message management server 1 that has received the advertisement content transmits the advertisement content (Step S208). The user terminal 4-1 that has received the advertisement content displays the advertisement image on the screen according to the advertisement content (Step S209).

Figure 13:
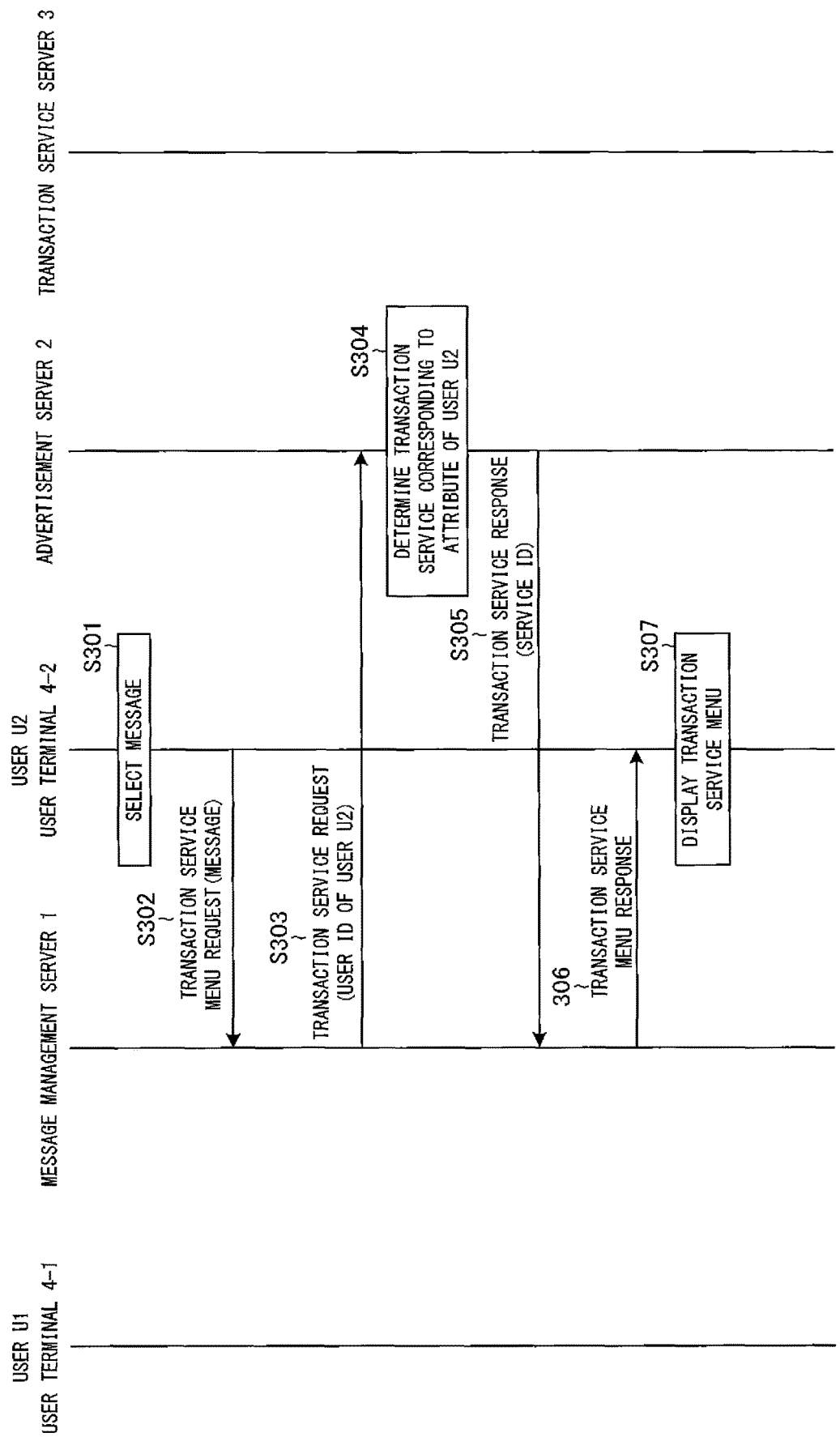
FIG. 13 is a sequence diagram illustrating an example of an operation of an advertisement system according to an embodiment.

On the other hand, the user U2 selects the message displayed on the chat screen 100-2 as illustrated in FIG. 13 (Step S301). In response to this, the user terminal 4-2 transmits the transaction service menu request including the selected message to the message management server 1 (Step S302). The second transmission unit 113 of the message management server 1 that has received the transaction service menu request transmits the transaction service request including the user ID of the user U2 to the advertisement server 2 (Step S303). The advertisement providing unit 211 of the advertisement server 2 acquires the user ID from the transaction service request received from the message management server 1. Then, the advertisement providing unit 211 determines the transaction service corresponding to the attribute of the user indicated by the user ID by the same method as that of Step S108 (Step S304). The advertisement providing unit 211 transmits the transaction service response including the service ID of the determined transaction service to the message management server 1 (Step S305). The second transmission unit 113 of the message management server 1 that has received the transaction service response generates data for displaying the transaction service menu 400 including the transaction service buttons 410 indicated by the service ID included in the transaction service response. The second transmission unit 113 transmits the transaction service menu response including the generated data to the user terminal 4-1 (Step S306). The user terminal 4-1 displays the transaction service menu 400 on the screen according to the transaction service menu response received from the message management server 1 (Step S307).

Figure 14:
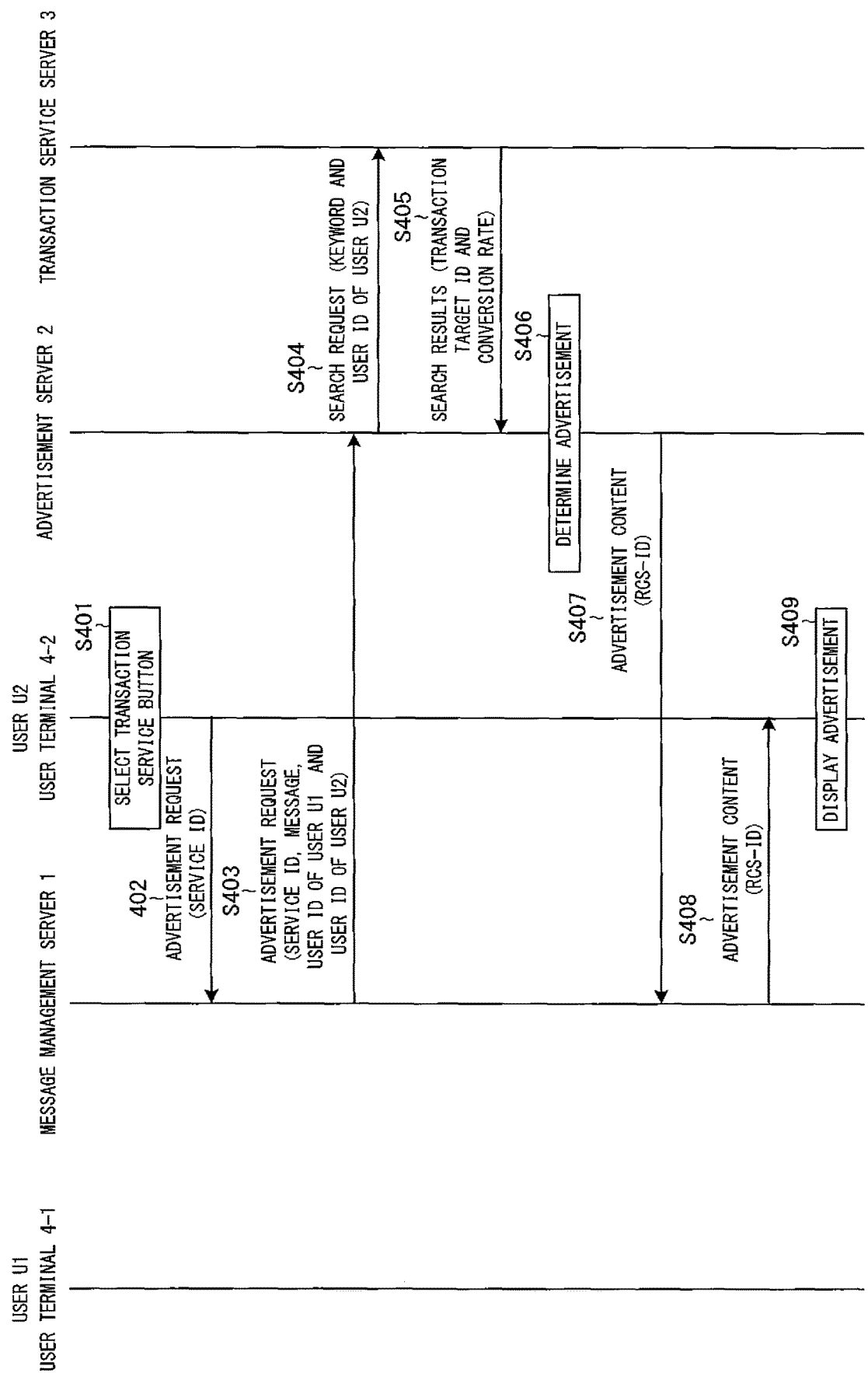
FIG. 14 is a sequence diagram illustrating an example of an operation of an advertisement system according to an embodiment.

Thereafter, as illustrated in FIG. 14, the user U2 selects any of the transaction service buttons 410 from the menu 400 (Step S401). In response to this, the user terminal 4-2 transmits the advertisement request including the service ID of the transaction service corresponding to the selected transaction service button 410 to the message management server 1 (Step S402). The second transmission unit 113 of the message management server 1 acquires the service ID from the advertisement request received from the user terminal 4-2. Then, the second transmission unit 113 transmits the advertisement request including the service ID, the message received from the user terminal 4-2 in Step S302, the user ID of the user U1, the user ID of the user U2, and the chat. ID of the chat room corresponding to the chat screen 100-2 of the user terminal 4-2 to the advertisement server 2 (Step S403). The advertisement providing unit 211 of the advertisement server 2 acquires the service ID, the message, and the user IDs from the advertisement request received from the message management server 1. The advertisement providing unit 211 extracts at least one keyword from the message. Then, the advertisement providing unit 211 transmits the search request including the at least one keyword and the user ID of the user U2 to the transaction service server 3 corresponding to the service ID acquired from the advertisement request (Step S404). The transaction service server 3 extracts one or more transaction targets by the same method as that of Step S205. The transaction service server 3 transmits the search results including the transaction target IDs of the extracted transaction targets and the conversion rates to the advertisement server 2 (Step S405).

The advertisement providing unit 211 of the advertisement server 2 that has received the search results determines the advertisement to be provided to the message management server 1 by the same method as that of Step S206 (Step S406). Next, the advertisement providing unit 211 generates content of the determined advertisement by the same method as that of Step S207. At this time, the advertisement providing unit 211 generates the affiliate link including the user ID of the user U1, and generates advertisement content including the affiliate link. The advertisement providing unit 211 transmits the generated advertisement content to the message management server 1 (Step S407). The second transmission unit 113 of the message management server 1 that has received the advertisement content transmits the advertisement content to the user terminal 4-2 (Step S408). The user terminal 4-2 that has received the advertisement content displays the advertisement image on the screen according to the advertisement content (Step S409).

Figure 15:
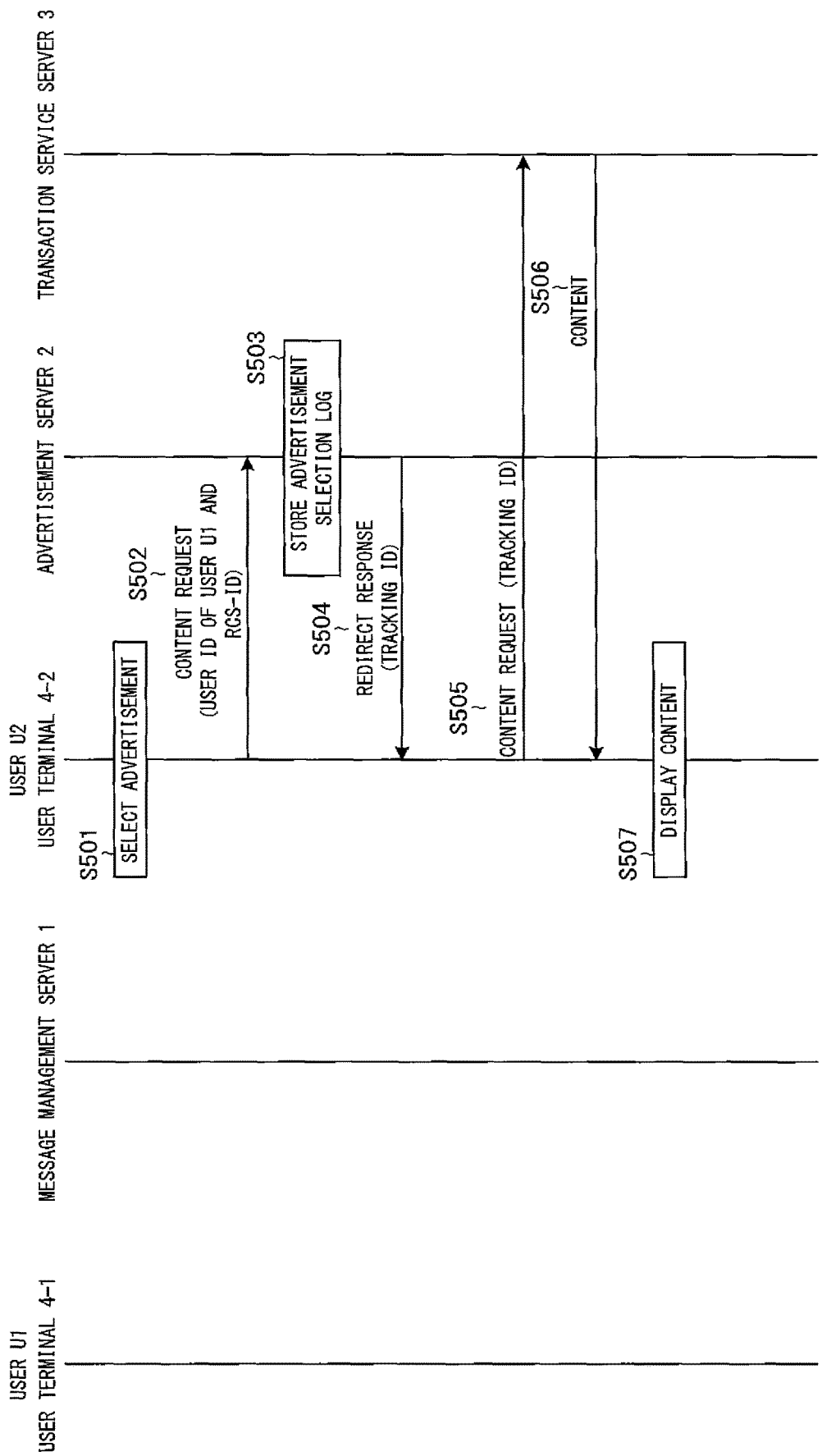
FIG. 15 is a sequence diagram illustrating an example of an operation of an advertisement system according to an embodiment.

Thereafter, as illustrated in FIG. 15, the user U2 selects the advertisement displayed on the chat screen 100-2 (Step S501). In response to this, the user terminal 4-2 transmits a content request including the URL set to the affiliate link included in the advertisement content to the advertisement server 2 (Step S502). The reward giving unit 212 of the advertisement server 2 that has received the content request acquires the user ID of the user U1, the advertisement ID, the service ID, the RCS-ID, the chat ID, and the link destination URL f rom the URL included in the content request. The reward giving unit 212 generates a new tracking ID, and generates the advertisement selection log including information acquired from the content request and the user ID of the user U2. The user ID of the user U1 is included, as the affiliater ID, in the advertisement selection log. The user ID of the user U2 is included, as the selection user ID, in the advertisement selection log. The reward giving unit 212 stores the generated advertisement selection log in the advertisement selection history DB 24c (Step S503). Next, the reward giving unit 212 transmits a redirect response including the tracking ID and the link destination URL to the user terminal 4-2 (Step S504).

The user terminal. 4-2 transmits a content request including the tracking ID and the link destination URL to the transaction service server 3 corresponding to the link destination URL according to the redirect response received from the advertisement server 2 (Step S505). The transaction service server 3 that has received the content request stores, for example, the tracking ID included in the content request in association with the user ID of the user U2. Furthermore, the transaction service server 3 transmits the content identified by the link destination URL to the user terminal 4-2 (Step S506). The user terminal 4-2 displays the content received from the transaction service server 3 (Step S507).

Figure 16:
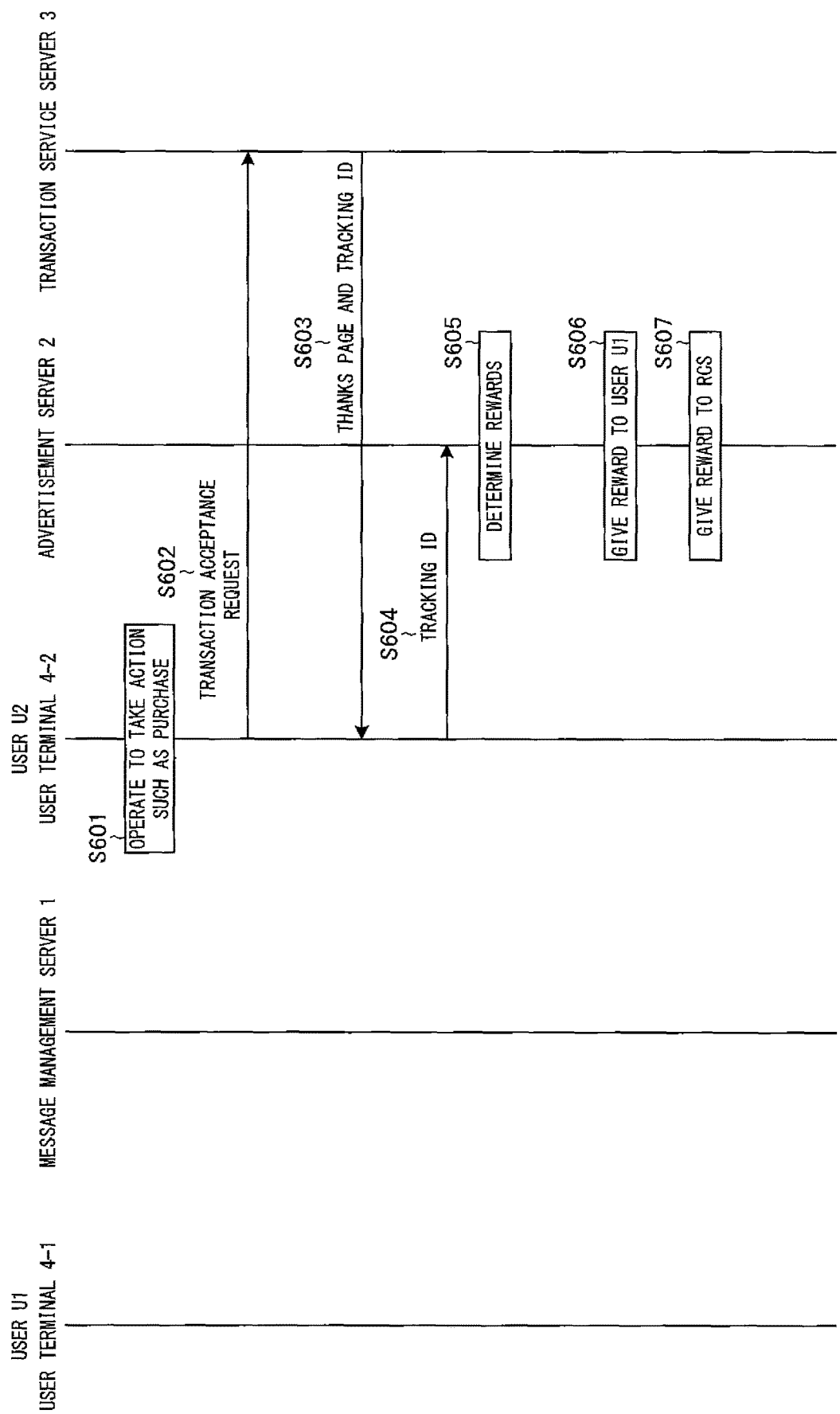
FIG. 16 is a sequence diagram illustrating an example of an operation of an advertisement system according to an embodiment.

Thereafter, as illustrated in FIG. 16, the user U2 uses the transaction service provided by the transaction service server 3 that has transmitted the content to perform an action corresponding to the successful result of the advertisement displayed on the user terminal 4-2 such as operation corresponding to purchase of an item for sale advertised by the advertisement (Step S601). In response to this, the user terminal 4-2 transmits a transaction acceptance request to the transaction service server 3 (Step S602). The transaction service server 3 that has received the transaction acceptance request executes, for example, processing of approving of a transaction corresponding to the action corresponding to the successful result of the advertisement. Then, the transaction service server 3 transmits the thanks page including the tracking ID stored in association with the user ID of the user U2 to the user terminal 4-2 (Step S603). The user terminal 4-2 transmits the tracking ID to the advertisement server 2 according to the conversion tag or the like included in the thanks page received from the transaction service server 3 (Step S604). The reward giving unit 212 of the advertisement server 2 that has received the tracking ID determines the reward corresponding to the successful result of the advertisement (Step S605). For example, the reward giving unit 212 acquires the advertisement selection log associated with the tracking ID from the advertisement selection history DB 24c. The reward giving unit 212 acquires the advertisement ID from the advertisement selection log. The reward giving unit 212 acquires the advertisement unit price associated with the advertisement ID from an advertisement DB 24b. The reward giving unit 212 calculates the affiliater reward amount by multiplying the advertisement unit price by a predetermined first ratio. Furthermore, the reward giving unit 212 calculates the RCS reward amount by multiplying the advertisement unit price by a predetermined second ratio. Furthermore, the reward giving unit 212 acquires the RCS-ID, the chat ID, and the affiliater ID from the advertisement selection log. The reward giving unit 212 generates the reward information including the acquired information and the determined reward amounts. The reward giving unit 212 stores the generated reward information in the reward DB 24d.

Thereafter, for example, the reward giving unit 212 gives the reward to the user at the turn of the month or the like (Step 606). For example, the reward giving unit 212 searches for the reward information including the user ID of the user as the affiliater ID for each user from among the reward information stored in the reward DB 24d during the past month. The reward giving unit 212 adds up the affiliater reward amounts included in the found reward information. Then, the reward giving unit 212 updates the number of possessed points stored in the member DB 14a by adding the number of points corresponding to the total amount to the number of possessed points of the target user. Furthermore, the reward giving unit 212 gives the reward to the provider of the RCS (Step S607). For example, the reward giving unit 212 searches for the reward information including the RCS-ID of the provider for each provider from among the reward information stored in the reward DB 24d during the past month. The reward giving unit 212 adds up the RCS reward amounts included in the found reward information. Then, the reward giving unit 212 accesses the online system of the bank and remits the savings currency corresponding to the total amount to the savings account of the provider of the RCS.

In a case where the user U1 selects the advertisement displayed on the chat screen 100-1, processing basically similar to the processing illustrated in FIGS. 15 and 16 is executed except that the operating user terminal 4 is the user terminal 4-1 and the target user is the user U1. However, in Step S605, the reward giving unit 212 determines the reward amount given to the user U1 as zero point. This is because the user who transmits the message and the user who selects the advertisement are the same. This can be determined by comparing the affiliater ID and the selection user ID, which are included in the advertisement selection log.

As described above, according to the present embodiment, the message management server 1 acquires the first user information indicating the user U1 and the second user information indicating the user U2 based on transmission of the message from the user terminal 4-1 to the user terminal 4-2. Furthermore, the message management server 1 transmits the advertisement corresponding to the attribute of the user U1 indicated by the acquired first user information to the user terminal 4-1. Furthermore, the message management server 1 transmits the advertisement corresponding to the attribute of the user U2 indicated by the acquired second user information to the user terminal. 4-2. In this manner, the advertisement corresponding to the attribute of the user U1 who transmits the message is transmitted to the user terminal. 4-1. Furthermore, the advertisement corresponding to the attribute of the user U2 who receives the message is transmitted to the user terminal 4-2. Therefore, it is possible to distribute the advertisement suitable for each of the sender and the receiver of the message to the user terminal 4 used by each of the sender and the receiver.

Here, the advertisement transmitted to the user terminal 4-1 may be an advertisement related to the transmitted message. In this case, the advertisement related to the message transmitted from the user terminal 4-1 is transmitted to the user terminal 4-1. The matter related to the message transmitted by the user U1 may be a matter in which the user U1 is interested. Since the advertisement in which the user U1 may be interested is presented to the user U1, the effects of the advertisement can be increased.

Furthermore, the advertisement transmitted to the user terminal 4-2 may be an advertisement related to the transmitted message. In this case, the advertisement related to the message transmitted from the user terminal 4-1 is transmitted to the user terminal 4-2. Since the user U1 transmits the message to the user U2, it is estimated that the user U1 and the user U2 are in a relationship of exchanging messages between them. Therefore, the matter related to the message transmitted by the user U1 may be a matter in which the user U2 is interested. Since the advertisement in which the user U2 may be interested is presented to the user U2, the effects of the advertisement can be increased.

Furthermore, the message management server 1 may transmit the advertisement to the user terminal 4-1 when the message displayed on the chat screen 100-1 of the user terminal 4-1 is selected by the user U1 from the screen. In this case, the advertisement is transmitted to the user terminal 4-1 when the user U1 selects the message transmitted by the user U1 on the screen.

Furthermore, the message management server 1 may transmit the advertisement to the user terminal 4-2 based on selection of the message displayed on the chat screen 100-2 of the user terminal 4-2 by the user U2 from the screen. In this case, the advertisement is transmitted to the user terminal 4-2 based on selection, on the screen by the user U2, of the message transmitted by the user U1.

Furthermore, the advertisement server 2 may execute processing of giving the reward to the party that manages the RCS system based on at least one of an action, done by the user U1, corresponding to the successful result of the advertisement after the user U1 selects the advertisement transmitted to the user terminal 4-1 or an action, done by the user U2, corresponding to the successful result of the advertisement after the user U2 selects the advertisement transmitted to the user terminal 4-2. In this case, when the user U1 or the user U2 selects the advertisement and takes an action corresponding to the successful result of the advertisement, the reward is given to the party that manages the message system. When the advertisement is displayed on the screen or the user interface, which are provided by the message system, the screen or the user interface is considered to be an advertisement medium. Therefore, the reward for the successful result of the advertisement can be given to the provider of the advertisement medium.

Furthermore, the message management server 1 may cause the advertisement to be displayed on the chat screen 100-1 of the user terminal 4-1. In this case, the advertisement can be displayed by the user terminal 4-1, together with the message transmitted from the user terminal 4-1.

Furthermore, the message management server 1 may cause the advertisement to be displayed on the chat screen 100-2 of the user terminal 4-2. In this case, the advertisement can be displayed by the user terminal 4-2 together with the message transmitted from the user terminal 4-1.

2. Second Embodiment

Next, a second embodiment will be described with reference to FIGS. 17 to 19. The second embodiment may be the same as the first embodiment except points explained below. In the present embodiment, the advertisement system S provides, as an advertisement to be transmitted to the user terminal 4-1, the advertisement in which the user U1 who is the sender of the message can acquire the reward for the successful result of the advertisement. For example, after the advertisement is displayed on the user terminal 4-1, the advertisement may be transmitted to the user terminal 4-2 according to operation done by the user U1. Processing of giving the reward to the user U1 is executed based on recognition that the user U2 takes an action corresponding to the successful result of the advertisement after the user U2 selects the advertisement. As described before, it is considered that there is certain validity in giving the affiliate reward to the user U1 who is the sender of the message.

This advertisement is an advertisement corresponding to the attribute of the user U1 as described in the first embodiment. On the other hand, as described in the first embodiment, the advertisement corresponding to the attribute of the user U2 may be transmitted to the user terminal 4-2. Therefore, in the present embodiment, there is a possibility that the advertisement corresponding to the attribute of the user U1 and the advertisement corresponding to the attribute of the user U2 are transmitted to the user terminal 4-2 as advertisements related to the same message. It is estimated that the user U1*l* and the user U2 are in a relationship of exchanging the messages between them. Therefore, there is a possibility that a common feature exists between them. For example, there is a possibility that the user U1 and the user U2 have common preferences and concerns. As described above, when the user U2 has the same attribute as the attribute of the user U1, the effect of the advertisement can be increased.

Figure 17:
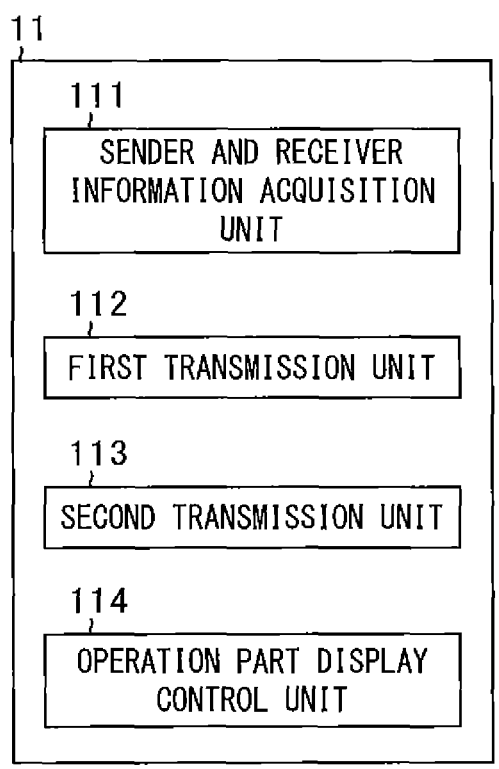
FIG. 17 is a diagram illustrating an example of a functional block of a system controller of a message management server.

FIG. 17 is a diagram illustrating an example of a functional block of the system controller 11 of the message management server 1. In the present embodiment, the system controller 11 functions as the sender and receiver information acquisition unit 111, the first transmission unit 112, the second transmission unit 113, an operation part display control unit 114 and so forth.

The operation part display control unit 114 causes the user terminal 4-1 to display an operation part operable to transmit the advertisement transmitted by the first transmission unit 112 to the user terminal 4-2. The operation part is not particularly limited as long as the operation part is a user interface part capable of performing operation such as selection. Examples of the operation part include a button, a link, an icon, and the like. For example, the operation part may be a button referred to as a sharing button. The sharing button is a button for the user U1 to share the advertisement with the user U2. There are various methods for displaying the operation part. For example, in a case where the application for RCS provides a function of displaying this operation part, the operation part display control unit 114 may transmit a request for display of the operation part to the user terminal 4-1 when the advertisement is transmitted to the user terminal 4-1. Alternatively, the application for RCS may provide a function of displaying a user interface such as a customizable menu based on data in a predetermined format such as HTML. In this case, the operation part display control unit 114 may transmit data for displaying the operation part to the user terminal 4-1 and cause the user terminal 4-1 to display the operation part based on the data.

In response to operation of the operation part displayed by the user terminal 4-1 by the user U1, the second transmission unit 113 transmits the advertisement transmitted to the user terminal 4-1 by the first transmission unit 112 to the user terminal 4-2. For example, the user terminal 4-1 may transmit the advertisement to the message management server 1, and the message management server 1 may transfer the message to the user terminal 4-2.

Figure 18A:
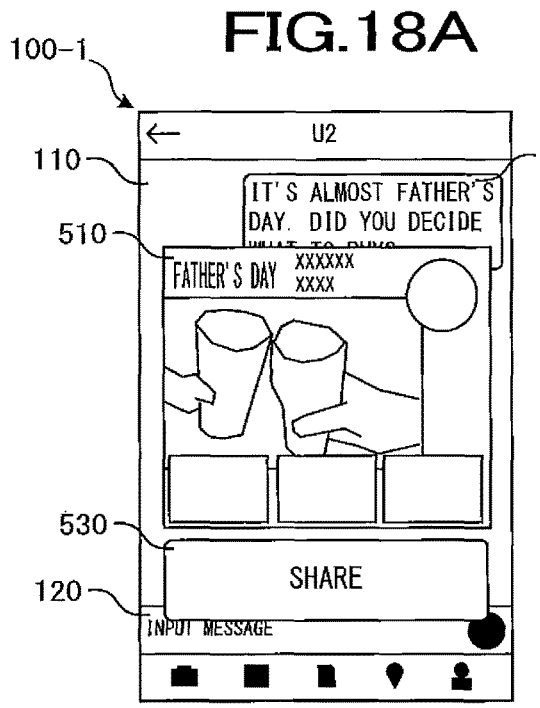
FIGS. 18A to 18D are views illustrating examples of a screen transition.
Figure 18B:
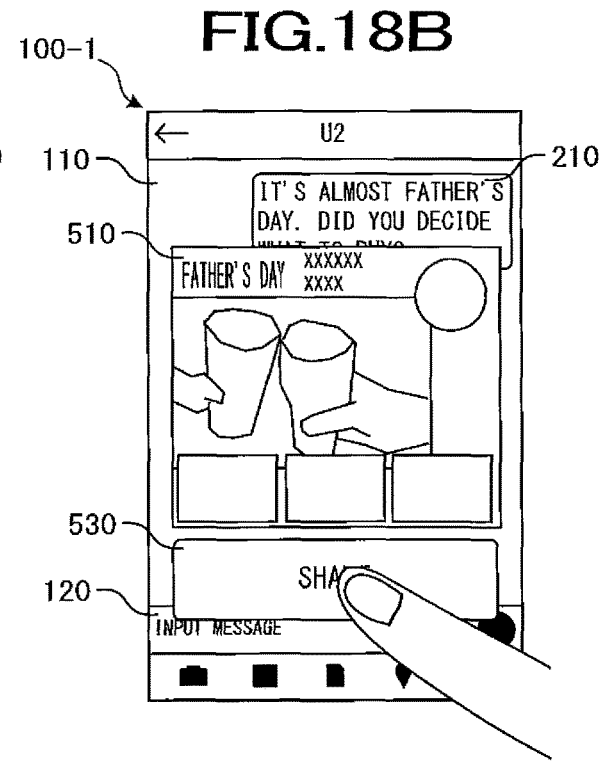
Figure 18C:
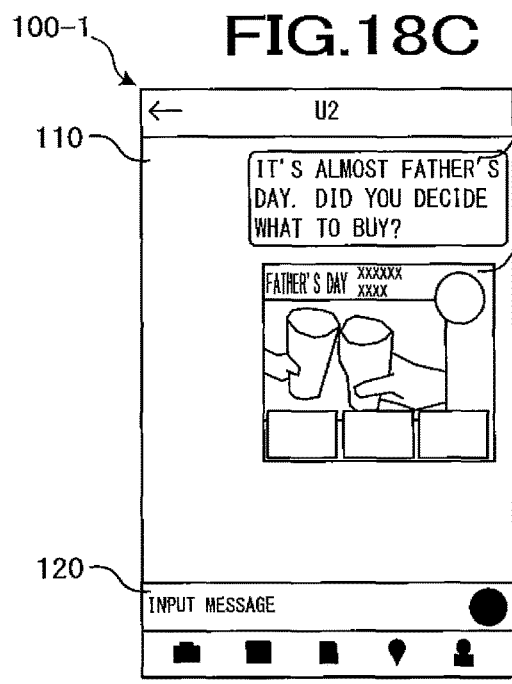
Figure 18D:
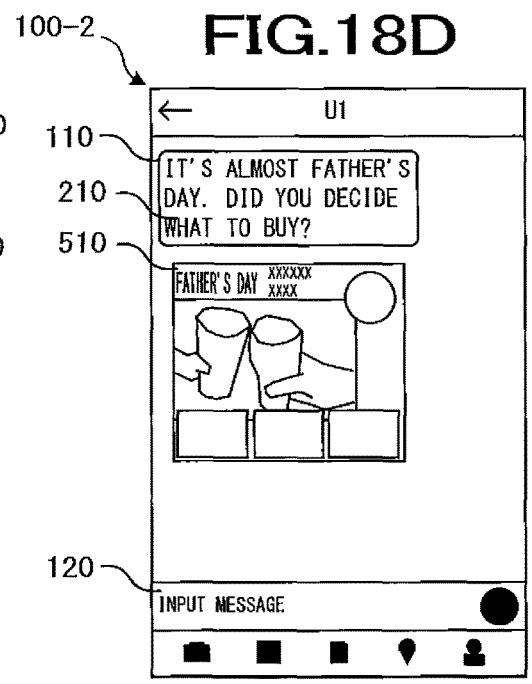

FIGS. 18A to 18D are views illustrating examples of a screen transition. As illustrated in FIG. 7D, after the transaction service menu 400 is displayed on the chat screen 100-1 of the user terminal 4-1, the user U1 selects any of the transaction service buttons 410 from the transaction service menu 400. Then, as illustrated in FIG. 18A, the user terminal 4-1 displays the advertisement 510 and a sharing button 530. Here, when the user U1 selects the advertisement 510, the user terminal 4-1 accesses the transaction service server 3 of the transaction service selected in the transaction service menu 400, and displays content of the transaction target advertised by the advertisement 510. On the other hand, as illustrated in FIG. 18B, when the user U1 selects the sharing button 530, the user terminal 4-1 transmits the advertisement 510 to the user terminal 4-2 via the message management server 1. Then, as illustrated in FIG. 18C, the user terminal 4-1 displays the transmitted advertisement 510 in the message display area 110 of the chat screen 100-1. On the other hand, the user U2 opens the chat screen 100-2. As illustrated in FIG. 18D, the user terminal 4-2 displays the message 210 and the advertisement 510 received from the user terminal 4-1, in the message display area 110 of the chat screen 100-2. Here, when the user U2 selects the advertisement 510, the user terminal 4-2 displays the content of the transaction target advertised by the advertisement 510.

FIG. 19 is a sequence diagram illustrating an example of the operation of the advertisement system S according to the embodiment. In FIG. 19, the same processing as that of FIG. 12 are denoted by the same reference numerals. First, the processing illustrated in FIG. 11 is executed, and then, as illustrated in FIG. 19, Steps S201 to S207 are executed. The first transmission unit 112 of the message management server 1 that receives the advertisement content from the advertisement server 2 in Step S207 transmits the advertisement content, together with the data for displaying the sharing button, to the user terminal 4-1 (Step 3701). The user terminal 4-1 that has received the advertisement content displays the advertisement image on the screen according to the advertisement content, and displays the sharing button according to the data received together with the advertisement content (Step S702).

Thereafter, when the user U1 selects the sharing button (Step S703), the user terminal 4-1 transmits the advertisement content and the chat ID of the chat room corresponding to the chat screen 100-1 to the message management server 1 (Step S704). The second transmission unit 113 of the message management server 1 acquires the user ID stored in the chat DB 14c in association with the chat ID received from the user terminal 4-1. The message management server 1 identifies the user U2 that is the transfer destination of the advertisement content based on the acquired user ID. The message management server 1 transfers the advertisement content and the chat ID, which are received from the user terminal 4-1, to the user terminal 4-2 used by the user U2 (Step S705). The user terminal 4-2 which receives the advertisement content and the chat ID displays the advertisement image in the message display area of the chat screen 100-2 corresponding to the chat ID according to the advertisement content (Step S706). Note that the second transmission unit 113 may acquire the advertisement permission information associated with the user ID of the user U2 from the advertisement permission information DB 14b. With reference to the advertisement permission information, the second transmission unit 113 may not transfer the advertisement content in a case where the user U2 does not accept the advertisement from the transaction service indicated by the service ID included in the advertisement content.

Thereafter, when the user U2 selects the advertisement displayed on the chat screen 100-2, the same processing as the processing illustrated in FIGS. 15 and 16 are executed.

As described above, according to the embodiment, the message management server 1 causes the user terminal 4-1 to display the operation part operable to transmit the advertisement transmitted to the user terminal 4-1 to the user terminal. 4-2. Furthermore, when the operation part displayed on the user terminal 4-1 is operated by the user U1, the message management server 1 transmits the advertisement transmitted to the user terminal 4-1 to the user terminal 4-2. Furthermore, the advertisement server 2 executes processing of giving the reward to the user JI based on recognition that the user U2 takes an action corresponding to the successful result of the advertisement after the user U2 selects the advertisement transmitted to the user terminal 4-2. Therefore, the sender can acquire the advertisement that enables the send to obtain the reward for the successful result of the advertisement by transmitting the message.

The invention claimed is:

1. An information communication system comprising:
   at least one memory having computer program code stored thereon; and
   at least one processor configured to read the computer program code from the at least one memory and operate as instructed by the computer program code, the computer program code comprising:
   first user interface displaying code configured to cause at least one of the at least one processor to display, on a first user screen of a first terminal device, a first user interface via which messages are transmitted and received between the first terminal device and a second terminal device, the first user interface including a message display area and a message input field in which a first message is input;
   second user interface displaying code configured to cause at least one of the at least one processor to display, on a second user screen of the second terminal device, a second user interface via which messages are transmitted and received between the first terminal device and the second terminal device, the second user interface including a message display area and a message input field in which a second message that is to be transmitted from the second terminal device to the first terminal device is input;
   acquisition code configured to cause at least one of the at least one processor to acquire first user information indicating a first user corresponding to the first terminal device and second user information indicating a second user corresponding to the second terminal device based on transmission of the first message input in the message input field of the first user interface from the first terminal device to the second terminal device;
   first displaying code configured to cause at least one of the at least one processor to:
   display the transmitted first message in the message display area of the first user interface on the first user screen of the first terminal device, and
   in response to the transmitted first message displayed on the message display area of the first user interface being selected by the first user, display a first menu based on attributes of the first user indicated by the acquired first user information, the first menu including a plurality of selection options overlaid on at least one of the message display area or the message input field of the first user interface;
   first transmission code configured to cause at least one of the at least one processor to, based on one of the plurality of selection options included in the first menu being selected by the first user, transmit, to the first terminal device, a first advertisement corresponding to the selected one of the plurality of selection options, to be displayed on the message display area of the first user interface and the message display area of the second user interface, respectively;

second displaying code configured to cause at least one of the at least one processor to:

display the transmitted first message in the message display area of the second user interface on the second user screen of the second terminal device, and in response to the transmitted first message displayed on the message display area of the second user interface being selected by the second user, display a second menu based on attributes of the second user indicated by the acquired second user information, the second menu including a plurality of selection options overlaid on at least one of the message display area or the message input field of the second user interface; and second transmission code configured to cause at least one of the at least one processor to, based on one of the plurality of selection options included in the second menu being selected by the second user, transmit, to the second terminal device, a second advertisement corresponding to the selected one of the plurality of selection options from the second menu, to be displayed on the message display area of the first user interface and the message display area of the second user interface, respectively, wherein the selection by the first user of the transmitted first message displayed on the message display area of the first user interface is by operation of a different operation part of the first user interface than the input and transmission of the first message in the message input field of the first user interface, and wherein the selection by the second user of the transmitted first message displayed on the message display area of the second user interface is by operation of a different operation part of the second user interface than the input and transmission of the second message as a reply to the transmitted first message in the message input field of the second user interface.

2. The information communication system according to claim 1, wherein the first advertisement is related to the transmitted first message.

3. The information communication system according to claim 1, wherein the second advertisement is related to the transmitted first message.

4. The information communication system according to claim 1, wherein
the first displaying code is further configured to cause at least one of the at least one processor to display the first advertisement in the message display area of the first user interface.

5. The information communication system according to claim 1, wherein
the second displaying code is further configured to cause at least one of the at least one processor to display the second advertisement in the message display area of the second user interface.

6. The information communication system according to claim 1, wherein
the first message is transmitted from the first terminal device to the second terminal device by using a message system that enables transmission and reception of messages between a plurality of terminal devices, and
the computer program code further comprises reward giving code configured to cause at least one of the at least one processor to execute processing of giving a reward to a party managing the message system based on at least one of an action, taken by the first user, corresponding to a successful result of the first advertisement after the first user selects the transmitted first advertisement, and an action, taken by the second user, corresponding to a successful result of the second advertisement after the second user selects the transmitted second advertisement.

7. The information communication system according to claim 1, wherein
the first terminal device displays the transmitted first message on the first user screen displaying thereon at least one message transmitted and received between the first terminal device and the second terminal device, and
the first transmission code is configured to cause at least one of the at least one processor to cause the first advertisement to be displayed on the first user screen.

8. The information communication system according to claim 1, wherein
the second terminal device displays the transmitted first message on the second user screen displaying thereon at least one message transmitted and received between the first terminal device and the second terminal device, and
the second transmission code is configured to cause at least one of the at least one processor to cause the second advertisement to be displayed on the second user screen.

9. An information communication method performed by at least one computer, the method comprising:

displaying, on a first user screen of a first terminal device, a first user interface via which messages are transmitted and received between the first terminal device and a second terminal device, the first user interface including a message display area and a message input field in which a first message is input;

displaying, on a second user screen of the second terminal device, a second user interface via which messages are transmitted and received between the first terminal device and the second terminal device, the second user interface including a message display area and a message input field in which a second message that is to be transmitted from the second terminal device to the first terminal device is input;

acquiring first user information indicating a first user corresponding to the first terminal device and second user information indicating a second user corresponding to the second terminal device based on transmission of the first message input in the message input field of the first user interface from the first terminal device to the second terminal device;

displaying the transmitted first message in the message display area of the first user interface on the first user screen of the first terminal device;

displaying, in response to the transmitted first message displayed on the message display area of the first user interface being selected by the first user, a first menu based on attributes of the first user indicated by the acquired first user information, the first menu including a plurality of selection options overlaid on at least one of the message display area or the message input field of the first user interface;

transmitting, based on one of the plurality of selection options included in the first menu being selected by the first user, to the first terminal device, a first advertisement corresponding to the selected one of the plurality of selection options, to be displayed on the message display area of the first user interface and the message display area of the second user interface, respectively;

displaying the transmitted first message in the message display area of the second user interface on the second user screen of the second terminal device;

displaying, in response to the transmitted first message displayed on the message display area of the second user interface being selected by the second user, a second menu based on attributes of the second user indicated by the acquired second user information, the second menu including a plurality of selection options overlaid on at least one of the message display area or the message input field of the second user interface; and transmitting, based on one of the plurality of selection options included in the second menu being selected by the second user, to the second terminal device, a second advertisement corresponding to the selected one of the plurality of selection options from the second menu, to be displayed on the message display area of the first user interface and the message display area of the second user interface, respectively, wherein the selection by the first user of the transmitted first message displayed on the message display area of the first user interface is by operation of a different operation part of the first user interface than the input and transmission of the first message in the message input field of the first user interface, and wherein the selection by the second user of the transmitted first message displayed on the message display area of the second user interface is by operation of a different operation part of the second user interface than the input and transmission of the second message as a reply to the transmitted first message in the message input field of the second user interface.

\* \* \* \* \*